(12) United States Patent
Nam et al.

(10) Patent No.: US 9,559,344 B2
(45) Date of Patent: Jan. 31, 2017

(54) LITHIUM BATTERY

(71) Applicant: Global Battery Co., Ltd., Seoul (KR)

(72) Inventors: Gueng Hyun Nam, Gwangju (KR); Sang Min Jang, Gwangju (KR); Seok Ho Kim, Gwangju (KR); Dong Ho Baek, Gwangju (KR); Min Ho Jang, Gwangju (KR)

(73) Assignee: Global Battery Co., Ltd., Seoul (KR)

( * ) Notice: Subject to any disclaimer, the term of this patent is extended or adjusted under 35 U.S.C. 154(b) by 0 days.

(21) Appl. No.: 14/982,227

(22) Filed: Dec. 29, 2015

(65) Prior Publication Data

US 2016/0133891 A1    May 12, 2016

Related U.S. Application Data

(62) Division of application No. 13/526,636, filed on Jun. 19, 2012, now Pat. No. 9,425,442.

(30) Foreign Application Priority Data

Feb. 28, 2012 (KR) .................. 10-2012-0020041
Feb. 28, 2012 (KR) .................. 10-2012-0020187

(51) Int. Cl.
| | | |
|---|---|---|
| *H01M 2/10* | (2006.01) | |
| *H01M 2/02* | (2006.01) | |
| *H01M 10/6555* | (2014.01) | |
| *H01M 10/0525* | (2010.01) | |
| *H01M 10/613* | (2014.01) | |
| *H01M 10/6551* | (2014.01) | |

(52) U.S. Cl.
CPC ......... *H01M 2/1016* (2013.01); *H01M 2/0217* (2013.01); *H01M 2/0245* (2013.01); *H01M 2/0267* (2013.01); *H01M 2/1011* (2013.01); *H01M 2/1022* (2013.01); *H01M 2/1061* (2013.01); *H01M 2/1072* (2013.01); *H01M 2/1077* (2013.01); *H01M 10/0525* (2013.01); *H01M 10/613* (2015.04); *H01M 10/6551* (2015.04); *H01M 10/6555* (2015.04); *H01M 2220/20* (2013.01); *H01M 2220/30* (2013.01)

(58) Field of Classification Search
CPC   H01M 2/0217; H01M 2/0245; H01M 2/0267; H01M 2/1011; H01M 2/1016; H01M 2/1061; H01M 2/1077; H01M 2/1072; H01M 2/1022; H01M 10/647; H01M 10/6555; H01M 10/6551; H01M 10/613; H01M 10/0525; H01M 2220/20; H01M 2220/30
See application file for complete search history.

(56) References Cited

U.S. PATENT DOCUMENTS

2008/0160395 A1 *   7/2008   Okada ................. B60L 3/0046
                                                                  429/99
2013/0011718 A1 *   1/2013   Hsiao .................. H01M 2/1077
                                                                  429/159

* cited by examiner

*Primary Examiner* — Eugenia Wang
(74) *Attorney, Agent, or Firm* — The PL Law Group, PLLC

(57) ABSTRACT

The present invention relates to a lithium battery and, more particularly, to a lithium battery, in which the structure of a battery module contained in the lithium battery is simplified, thus reducing the size of the entire lithium battery, and which includes a connector by which two or more lithium batteries are mechanically coupled to each other so that in response to a required amount of power, an appropriate number of lithium batteries can be easily connected to each other.

11 Claims, 18 Drawing Sheets

LITHIUM BATTERY

CROSS-REFERENCE TO RELATED APPLICATION AND CLAIM OF PRIORITY

This application is a divisional application of application Ser. No. 13/526,636, filed on Jun. 19, 2012, which claims priority to Korean Patent Application Nos. 10-2012-0020041, filed on Feb. 28, 2012, and 10-2012-0020187, filed on Feb. 28, 2012, which are incorporated herein by reference in their entirety.

BACKGROUND

1. Field of the Invention

The present invention relates generally to lithium batteries.

2. Description of the Related Art

Secondary batteries are batteries which are designed to be recharged and used multiple times, unlike primary batteries. Recently, a lot of research into such secondary batteries being conducted along with development of high technology fields related to, for example, digital cameras, cellular phones, notebook computers, hybrid vehicles, etc. Nickel-cadmium batteries, nickel-metal hydride batteries, lithium secondary batteries, etc. are representative examples of the secondary batteries. Among such examples, the operating voltage of the lithium secondary batteries (hereinafter, referred to as 'lithium batteries') ranges from 2.0 V to 4.2 V or may be higher. Such a lithium battery may be typically used as a power supply for mobile electronic devices, or a plurality of lithium batteries may be connected in series to each other and used in a high power hybrid vehicle. The operating voltage of the lithium batteries is three times greater than that of nickel-cadmium batteries or nickel-metal hydride batteries. The energy density per unit weight of the lithium batteries is also comparatively high. Therefore, the use of the lithium batteries is rapidly increasing.

Such a lithium battery includes a bare cell which includes battery tabs through which power is input or output, and a case in which the bare cell is housed. Here, the bare cell that is housed in the case is called a battery cell.

The battery cell includes a pouch type bare cell and a battery cell case. The battery cell case includes a front case plate and a rear case plate which are disposed on front and rear surfaces of the bare cell and are separably coupled to each other to protect the bare cell.

In conventional battery cell cases, a front case plate and a rear case plate are made of metal or adiabatic plastic and are coupled to each other while in close contact with the front and rear surface of a bare cell. The front and rear case plates are fastened to each other by screws or bolts after having been put in close contact with each other.

As such in the case of the conventional battery cell cases, the process of fastening the front case plate to the rear case plate includes inserting bolts or screws into the front and rear case plates and tightening the bolts or screws using a tool, such as a screwdriver or wrench. Therefore, the working time required to assemble the battery cell case is increased, thus reducing productivity.

Furthermore, in the case of a lithium battery using the conventional battery cell, typically, a plurality of battery cells are contained in a single case and are connected in series or parallel to each other, thus forming a medium-large sized lithium battery that can be used as a high-voltage power supply in an industrial site.

The medium-large sized lithium battery generally includes ten or more battery cells that are electrically connected to each other. Such medium-large sized lithium batteries have been used in places where industrial or large-capacity power is needed. On the other hand, in the case of a lithium battery for domestic or portable use, two to ten battery cells are typically connected in series or parallel to each other.

As such, the conventional lithium batteries can be electrically connected to each other to produce a required amount of power. However, the connection between the lithium batteries is just an electrical connection in which the lithium batteries are mechanically separated from each other. Therefore, accidents caused by negligence may occur at industrial sites, and it may become an inconvenience for pedestrians.

Moreover, in the conventional lithium battery having one or more bare cells, a comparative large volume case that houses each bare cell increases the size of the entire lithium battery. The greater the capacity of the lithium battery is, the larger is the size of the entire lithium battery. Therefore, it is very inconvenient to transfer or store the lithium battery.

SUMMARY

According to an aspect of the present invention, lithium batteries each of which contains two or more battery cells can be mechanically connected to each other, thus ensuring that the use of the lithium batteries is safe.

Another aspect of the present invention is to provide a lithium battery in which cases that house the bare cells can be coupled to each other in an insert coupling manner without using a separate locking member or fastening device, thus reducing the size of the entire lithium battery.

A further aspect of the present invention is to provide a lithium battery which is configured such that the lithium battery containing at least one battery cell can be coupled to another lithium battery without using a separate locking member or fastening device, thus reducing the number of elements, thereby reducing the size of the entire lithium battery assembly including the lithium batteries.

In an embodiment of the present invention, a lithium battery includes: a battery module having battery cells electrically connected to each other such that power of different poles is input into or output from the battery cells; an upper plate member forming an upper surface of the lithium battery, the upper plate member covering an upper end of the battery module contained in the lithium battery; a lower plate member forming a bottom plate of a space that contains the battery module therein; side plate members including a pair of side plate bodies provided at positions spaced apart from each other to form opposite side surfaces of the lithium battery, the side plate bodies being coupled at upper and lower ends thereof to the lower plate member and the upper plate member; and end plate members coupled to front and rear ends of the side plate members to form front and rear surfaces of the lithium battery, wherein either of the pair of side plate bodies of the side plate members includes a connection plate extending therefrom in one direction, with a connection protrusion protruding downwards from a lower surface of the connection plate, and a remaining one of the pair of side plate bodies has a connection depression into which a connection plate of another lithium battery is able to be seated.

In an embodiment, the upper plate member may have: an upper depression formed in a vertical extension panel extending downwards from a top surface of the upper plate member so that the connection depression is open upwards through the upper depression; and an upper locking slot formed in each of opposite end surfaces of the vertical extension panel.

In an embodiment, each of the end plate members may include: an end plate body provided upright and inserted into each of front and rear ends of the pair of side plate members; at least one first insert protrusion protruding upwards from an upper end of the end plate body; a first locking protrusion protruding upwards from the upper end of the end plate body, with a hook provided on an end of the first locking protrusion, the hook of the first locking protrusion being locked to the corresponding upper locking slot; at least one second insert protrusion protruding downwards from a lower end of the end plate body; and a second locking protrusion protruding upwards from the lower end of the end plate body, with a hook provided on an end of the second locking protrusion, the hook of the second locking protrusion being locked to the lower plate member.

In an embodiment, the lower plate member may include: a bottom plate on which the battery module is placed; bottom side panels protruding upwards on opposite side edges of the bottom plate, each of the bottom side panels having a stepped portion on an inner surface thereof so that the lower end of the corresponding side plate body is inserted inside the inner surface of the bottom side panel and seated onto the stepped portion; and bottom end panels protruding upwards from front and rear ends of the bottom plate, each of the bottom end panels having a lower locking slot to which the corresponding second locking protrusion is locked.

In an embodiment, each of the side plate members may include: a first insert plate provided and stepped on the upper end of the side plate body, the first insert plate being inserted into the upper plate member and seated onto an inner surface of the upper plate member; a second insert plate protruding downwards from the lower end of the side plate body such that a stepped portion is formed therebewteen, the second insert plate being inserted into the lower plate member and seated onto the stepped portion formed on the corresponding bottom side panel of the lower plate member; and front and rear end parts bent from the front and rear ends of the side plate body towards the opposing other side plate body, the front and rear end parts extending in a vertical direction, wherein each of the first insert plate and the second insert plate includes guides extending towards the front and rear end parts, and bent towards the opposing other side plate body, and protruding from the front and rear end parts.

In an embodiment, the end plate body may include an outer plate placed upright at an outer position, and an inner plate attached to an inner surface of the outer plate at a position spaced apart from the outer plate, whereby spaces are defined between opposite side edges of the outer plates and the inner plates, thus forming insert slots into which the corresponding guides are inserted.

In an embodiment, each of the end plate members may further include a heat dissipation window through which heat generated by the battery module is dissipated.

In an embodiment, each of the battery cells may include a front case plate and a rear case plate respectively disposed on a front surface and a rear surface of a bare cell, the bare cell being provided with battery tabs through which power is input into or output from the bare cell, the front and rear case plates being removably coupled to each other, wherein the front case plate includes: front horizontal frames respectively provided on upper and lower ends of the front case plate, each of the front horizontal frames extending in a horizontal direction and forming a horizontal surface; and front vertical side frames forming upright surfaces extending in a vertical direction between opposite ends of the front horizontal frames, and the rear case plate includes: rear horizontal frames respectively provided on upper and lower ends of the rear case plate, each of the rear horizontal frames extending in a horizontal direction and forming a horizontal surface; and rear vertical side frames forming upright surfaces extending in a vertical direction between opposite ends of the rear horizontal frames, wherein when the front case plate is seated into an inner surface of the rear case plate, outer surfaces of the front horizontal frames are brought into close contact with inner surfaces of the corresponding rear horizontal frames, and outer surfaces of the front vertical side frames are brought into close contact with inner surfaces of the corresponding rear vertical side frames such that the front case plate is fitted into the rear case plate.

In an embodiment, the front case plate may have at least one first locking depression formed in the front horizontal frame that is provided on the upper end of the front case plate, and the rear case plate may include a locking member provided in the rear horizontal frame that is provided on the upper end of the rear case plate, and the locking member has a hook on a lower surface thereof so that the hook of the locking member is locked to the first locking depression.

In an embodiment, the front case plate may further include at least one second locking depression formed in the front horizontal frame that is provided on the lower end of the front case plate and extends in the horizontal direction. The rear case plate may further include a lower stopper protruding upwards from the horizontal surface of the rear horizontal frame that is provided on the lower end of the rear case plate and extends in the horizontal direction, the lower stopper being locked into the second locking depression.

In an embodiment, the front case plate may include: a front plate body having a planar inner surface with which the bare cell is brought into close contact, and an outer surface on which the front horizontal frames and the front vertical side frames are provided; a front heat dissipation window formed through the front plate body to dissipate heat generated by the bare cell; a front support bar provided in the front heat dissipation window and extending in the vertical direction; and front tab guides protruding upwards from an upper surface of the front horizontal frame that is provided on the upper end of the front case plate, the front tab guides guiding the corresponding battery tabs of the bare cell.

In an embodiment, the rear case plate may include: a rear plate body having a planar inner surface with which the bare cell is brought into close contact, with the rear horizontal frames and the rear vertical side frames provided on the inner surface of the rear plate body; a rear heat dissipation window formed through the rear plate body to dissipate heat generated by the bare cell; a rear support bar provided in the rear heat dissipation window and extending in the vertical direction; and rear tab guides protruding upwards from an upper surface of the rear horizontal frame that is provided on the upper end of the rear case plate, the rear tab guides guiding the corresponding battery tabs of the battery cell.

In an embodiment, the front case plate may further include a concave part depressed in each of the front vertical side frames provided on the opposite ends of the outer surface of the front case body that is not brought into contact with the bare cell, and the rear case plate may further include a convex part protruding inwards from each of the rear vertical side frames such that the convex part corresponds to the associated concave part of the front case plate, wherein the convex part has a coupling hole formed in a first surface thereof oriented towards the front case plate, and a coupling protrusion provided on a second surface thereof opposite to the coupling hole.

In an embodiment, a lithium battery may include: a battery module having battery cells electrically connected to each other such that power of different poles is input into or output from the battery cells; an upper plate member forming an upper surface of the lithium battery, the upper plate member covering an upper end of the battery module contained in the lithium battery; a lower plate member forming a bottom plate of a space that contains the battery module therein; and side plate members placed upright, the side plate members being coupled at upper ends thereof to the upper plate member and coupled at lower ends thereof to the lower plate member, wherein the upper plate member includes a connection plate extending from a top surface of the upper plate member in one direction, with a locking protrusion produced under a lower surface of the connection plate; an open slot formed in the top surface at a position opposite to the connection plate, the open slot having a shape corresponding to a distal end of the connection plate; and a connection hole formed inside the open slot so that the locking protrusion of the connection plate is removably locked into the connection hole.

In an embodiment, the upper plate member may further include at least one first locking slot formed in each of vertical extension panels that extend from opposite side edges of the top surface, the lower plate member may further include at least one second locking slot formed in each of side panels that vertically protrude upwards from opposite side edges of the bottom plate, and each of the side plate members may further include: a first elastic protrusion provided on an upper end of the side plate member, the first elastic protrusion being locked to the corresponding first locking slot; and a second elastic protrusion provided on a lower end of the side plate member that is inserted inside the corresponding side panel of the lower plate member, the second elastic protrusion being locked to the corresponding second locking slot.

In an embodiment, each of the side plate members may include a side plate body coupled at an upper end thereof to the upper plate member and coupled at a lower end thereof to the lower plate member, and the battery module may include at least one battery cell having a cell case and bare cells provided on front and rear surfaces of the cell case such that the cell case and the bare cells alternate with each other, wherein one side surface of each of outermost bare cells is supported by the front or rear surface of the cell case, and a remaining side surface of the outermost bare cell is supported by an inner surface of the corresponding side plate body.

In an embodiment, each of the first and second elastic protrusions may be configured such that a proximal end thereof extends from the corresponding side plate member, a hook is provided on a distal end thereof, the hook being locked into a corresponding one of the first and second locking slots, and opposite side edges thereof are separated from the side plate member.

In an embodiment, each of the battery cells may include a cell case containing pouch type bare cells, the cell case including: a case body placed upright and receiving the bare cells, the cell case having an upper horizontal frame and a lower horizontal frame respectively provided on upper and lower edges of the case body, and vertical side frames extending between opposite ends of the upper and lower horizontal frames; a coupling protrusion protruding from a first surface of the case body in one direction; and a coupling hole formed in a second surface of the case body so that the coupling protrusion of another cell case is inserted into the coupling hole.

In an embodiment, either of the side plate members may further include an insert protrusion provided on at least one surface thereof that faces the battery module contained in the lithium battery, the insert protrusion being inserted into the coupling hole of the cell case.

In an embodiment, the cell case may include tab guides protruding upwards from an upper end of the case body, wherein the tab guides includes: a pair of tab guides disposed at a side corresponding to the front surface of the case body at positions spaced apart from each other; and a pair of tab guides disposed at a side corresponding to the rear surface of the case body at positions spaced apart from each other.

In an embodiment, the cell case may further include a circuit board support protrusion protruding upwards from the upper horizontal frame that forms an upper surface of the case body, the circuit board support protrusion supporting a circuit board, wherein the circuit board support protrusion includes two rods spaced apart from each other, with a hook protruding from an upper end of each of the two rods, the hook having a downwardly inclined surface.

In an embodiment, the cell case may further include: a heat dissipation window formed in the case body to dissipate heat generated by the bare cells; horizontal support frames provided in the case body and forming planar surfaces extending in the horizontal direction on upper and lower edges of the heat dissipation window so that the bare cells are respectively seated onto the front and rear surfaces of the case body; and a support bar vertically provided in a medial portion of the heat dissipation window and fastened to the horizontal support frames.

In an embodiment, the cell case may further include: a plurality of vertical partition ribs provided on the front and rear surfaces of the case body, each of the vertical partition ribs extending a predetermined length vertically; and a plurality of horizontal partition ribs provided on the front and rear surfaces of the case body, each of the horizontal partition ribs extending a predetermined length horizontally.

In an embodiment, each of the side plate members may further include a plurality of heat dissipation slots formed in the side plate member to dissipate heat generated by the battery module.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, embodiments of a lithium battery according to the present invention will be described in detail with reference to the attached drawings.

Figure 1:
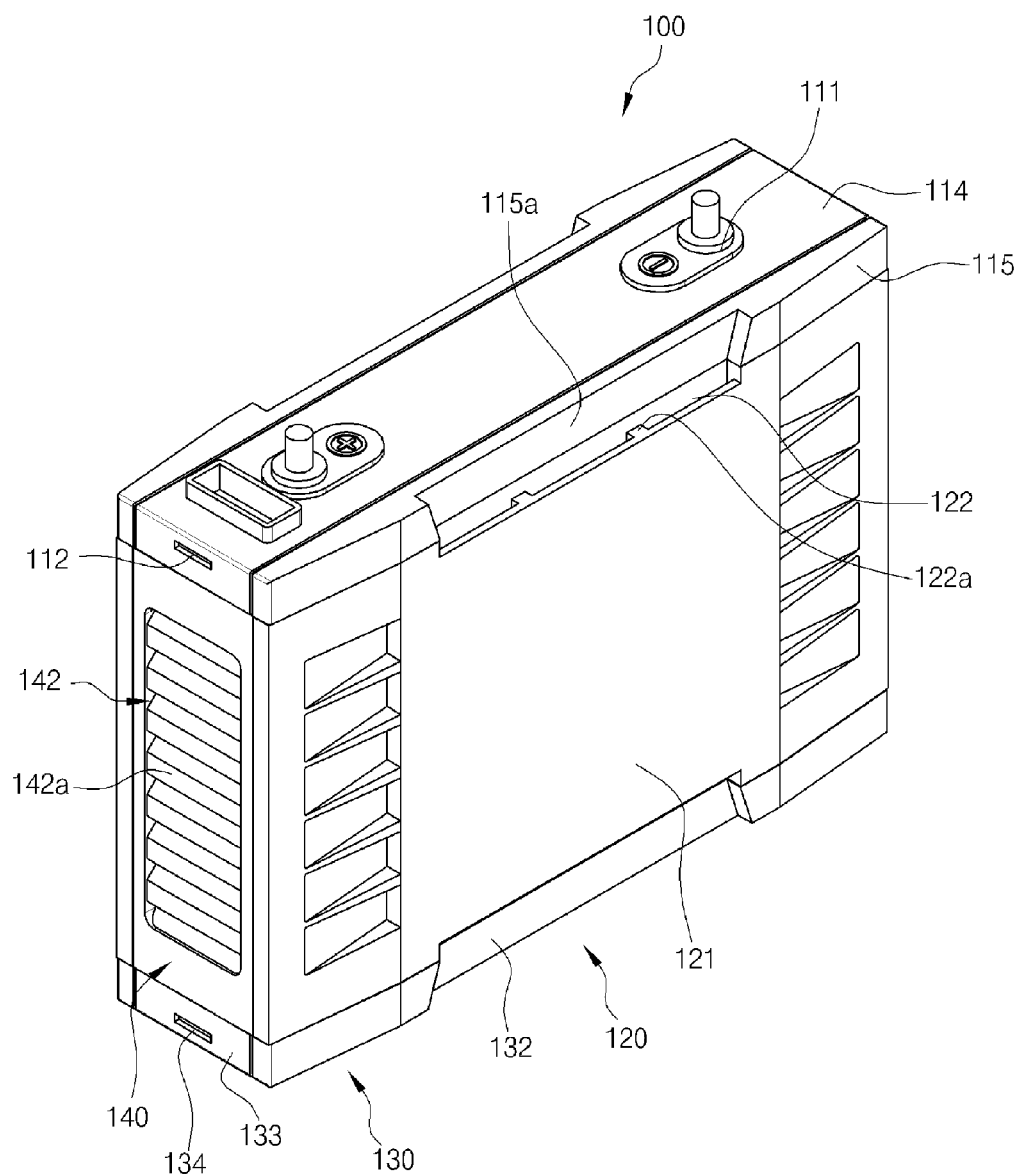
FIG. 1 is a perspective view showing a lithium battery, according to an embodiment of the present invention.
Figure 2:
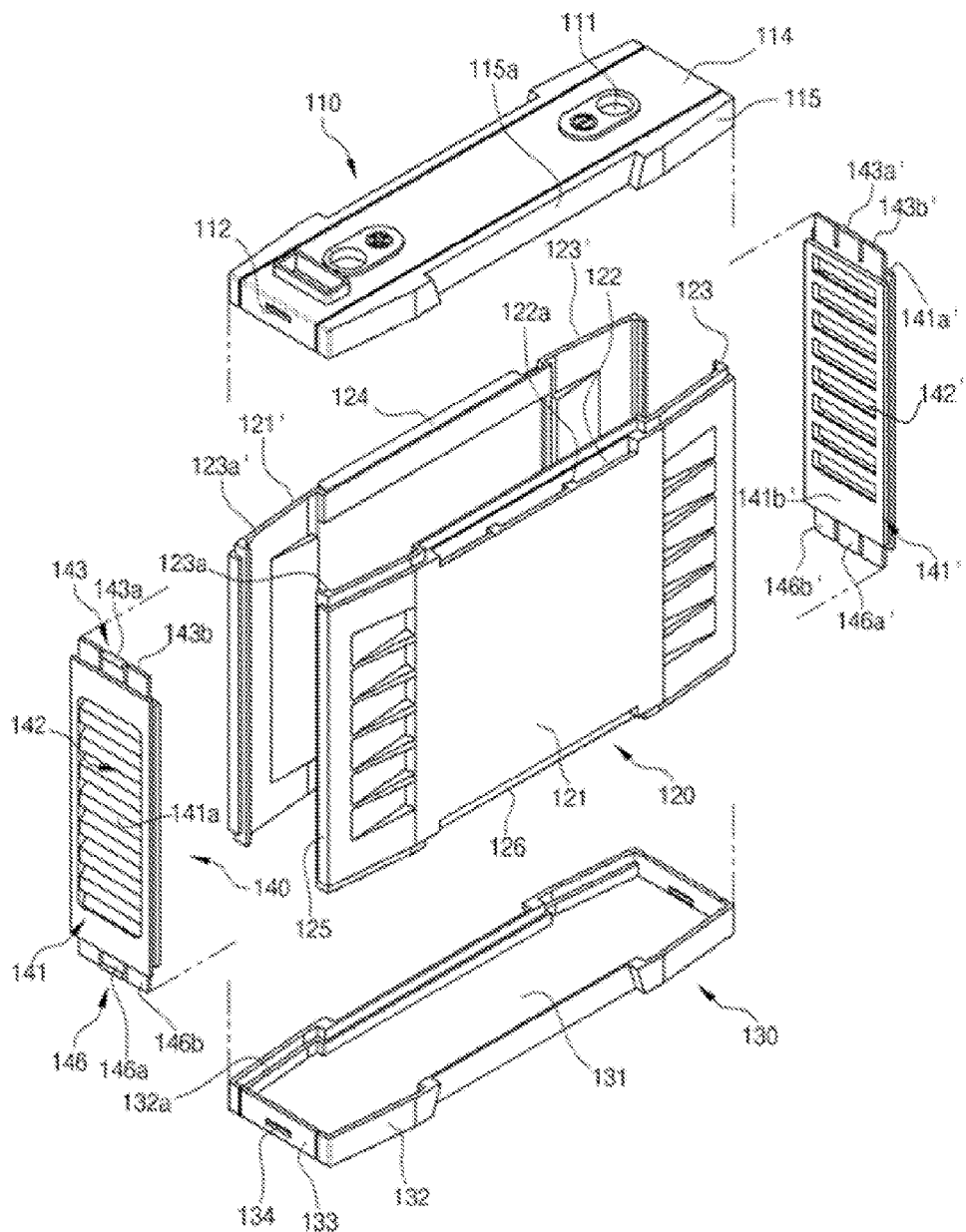
FIG. 2 is an exploded perspective view showing the lithium battery according to the embodiment of the present invention.

FIG. 1 is a perspective view showing the lithium battery according to an embodiment of the present invention. FIG. 2 is an exploded perspective view showing the lithium battery.

Referring to FIGS. 1 and 2, the lithium battery according to an embodiment of the present invention includes a battery module which includes one or more battery cells connected to each other, side plate members 120 which are disposed on opposite sides of the battery module, an upper plate member 110 which is provided on upper ends of the side plate member 120, a lower plate member 130 which forms the bottom of a space that contains the battery cells, and end plate members 140 which are provided on front and rear ends of the side plate members 120 that are spaced apart from each other.

The battery module includes the battery cells that are electrically connected to each other. The battery module is placed on the lower plate member 130. Each battery cell includes a pouch type bare cell (220, see FIGS. 8 and 9), a front case plate (240, see FIGS. 8 and 9) and a rear case plate (230, see FIGS. 8 and 9). The bare cell 220 includes a cell body 222 which outputs power or is charged with power, and battery tabs 221 through which power is input into or output from the cell body 222. The front and rear case plates 240 and 230 are disposed on front and rear surfaces of the bare cell 220 and are separably coupled to each other.

Several battery cells each of which has the above-mentioned construction are electrically connected to each other, forming a single battery module. The battery module is housed in a case of the lithium battery. The construction and operation of the battery cell will be explained later with reference to FIGS. 8 through 11.

The upper plate member 110 includes a top surface 114, a vertical extension panel 115, upper depressions 115a and upper locking slots 112. The top surface 114 has electrode pole holes 111 through which electrode poles protrude outwards from the top surface 114. The vertical extension panel 115 extends downwards from front, rear, left and right edges of the top surface 114, thus forming front, rear, left and right surfaces of the upper plate member 110. The upper depressions 115a are depressed inwards from the vertical extension panel 115, thus forming stepped portions. The upper locking slots 112 are respectively formed in the opposite end surfaces of the vertical extension panel 115.

The vertical extension panel 115 includes surfaces that extend downwards from the edges of the top surface 114, and the opposite side surfaces of the vertical extension panel 115 are curved in the sideways direction. The vertical extension panel 115 has upper depressions 115a formed in the respective opposite side surfaces. In an embodiment, the shape and size of each upper depression 115a correspond to those of a connection depression 122 of the corresponding side plate member 120 which will be explained later.

Further, the vertical extension panel 115 has upper stepped portions, formed in the lower edge thereof, each of which has a shape corresponding to a lower stepped portion 132a that is formed in each of inner side surfaces of the lower plate member 130, as shown in FIG. 2. However, one difference is that the stepped portions (not shown) that are formed in the inner side surfaces the vertical extension panel 115 are depressed upwards unlike the lower stepped portions 132a that are depressed downwards in the inner side surfaces of the lower plate member 130. This will be able to be easily understood by those skilled in this art. Upper ends of the side plate members 120 are inserted and seated onto the corresponding stepped portions of the vertical extension panel 115.

The upper locking slots 112 are respectively formed through the opposite end surfaces of the vertical extension panel 115 of the upper plate member 110. The end plate members 140 are locked to the corresponding upper locking slots 112.

The side plate members 120 will be explained with reference to FIG. 3.

Figure 3:
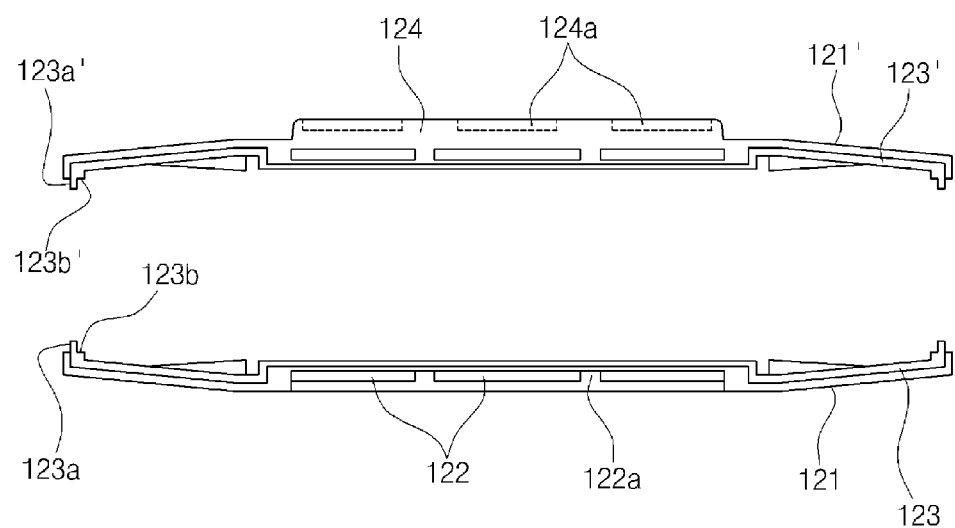
FIG. 3 is a plan view showing side plate members of the lithium battery according to the embodiment of the present invention.

FIG. 3 is a plan view illustrating the side plate members 120 of the lithium battery according to an embodiment of the present invention.

Referring to FIG. 3, the side plate members 120 are located at positions where they are spaced apart from each other by a predetermined distance. Each side plate member 120 includes a side plate body 121 which is placed upright; an upper insert plate 123 which is inserted into the vertical extension panel 115; a lower insert plate 126 which is provided on the lower edge of the side plate body 121 and is inserted into the lower plate member 130; and front and rear end parts 125 which are respectively bent from the front and rear edges of the side plate body 121 and extend in the vertical direction. A connection depression 122 is formed downwards in the upper end of the side plate body 121 of one of the side plate members 120. A connection plate 124 is provided on the side plate body 121 of the other side plate member 120 so that the connection plate 124 can be coupled to the connection depression 122 of another lithium battery.

The two main side plate bodies 121 are provided at positions spaced apart from each other and are placed upright at opposite sides on the lower plate member 130.

The upper insert plate 123 protrudes upwards from the upper edge of the side plate body 121 and is seated into the corresponding one of the stepped portions each of which is formed in the inner surface of the lower end of the vertical extension panel 115. The opposite ends of the upper insert plate 123 are bent towards the other side plate body 121, thus forming a guide 123a for the connection with the end plate members 140.

The lower insert plate 126 protrudes downwards from the lower edge of the side plate body 121 and is seated into the corresponding one of the lower stepped portions 132a that are formed in the inner surface of the upper end of the lower plate member 130.

The front and rear end parts 125 are perpendicularly bent from the front and rear edges of the side plate body 121 towards the central portion of the lithium battery. Each of the front and rear end parts 125 extends in the vertical direction. The upper insert plate 123 extends upwards from the upper edges of the front and rear end parts 125 in a shape in which the guide 123a protrudes upwards inside the front and rear end parts 125.

The connection depression 122 is a depression which is formed in a stepped shape in the upper end of one of the main side plate bodies 121 and 121', for example, of the side plate body 121. A partition 122a that extends in the vertical direction is provided in the connection depression 122 so that the space in the connection depression 122 is partitioned into two or more spaces.

The connection plate 124 extends outwards from the other of the main side plate bodies 121 and 121', for example, the side plate body 121' that does not have the connection depression 122, so that connection plate 124 can be removably coupled to the connection depression 122 of the side plate body 121 of an adjacent lithium battery. To achieve this, a connection protrusion 124a which is locked into the connection depression 122 may be provided under the lower surface of the connection plate 124.

The connection protrusion (124a, refer to FIGS. 3 and 7) is a protrusion that protrudes downwards from the lower surface of the connection plate 124. The number of connection protrusions may be the same as that of the connection depression 122 or there be provided as many as needed to maintain the connection between the adjacent lithium batteries.

Figure 4:
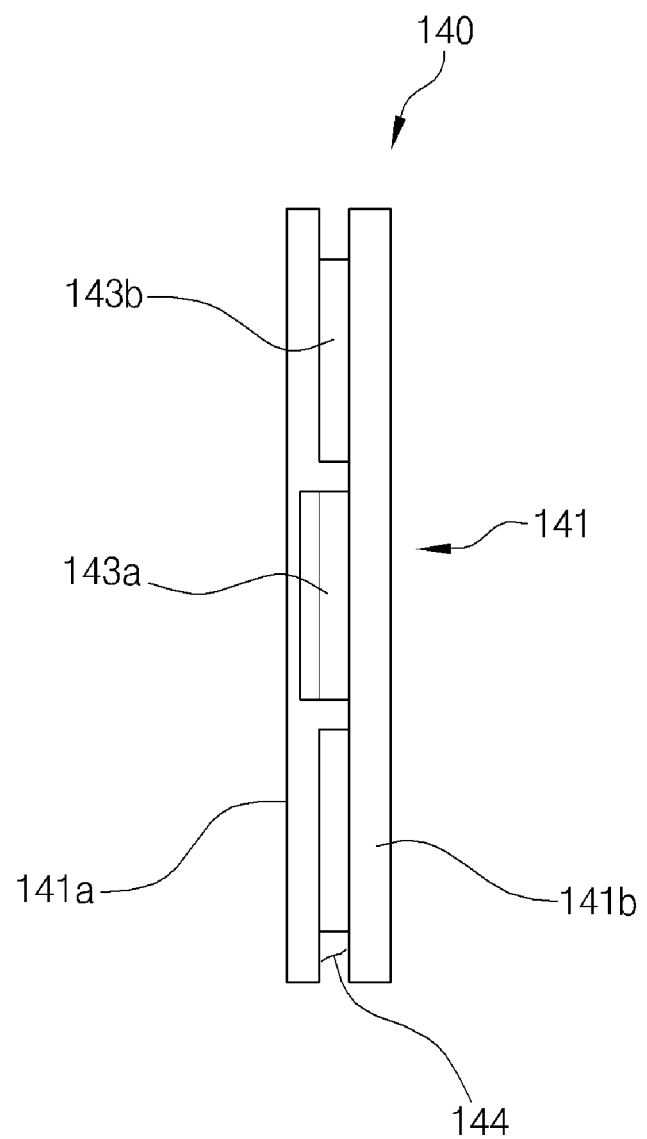
FIG. 4 is a plan view showing an end plate member of the lithium battery according to the embodiment of the present invention.

The end plate members 140 are respectively inserted into front and rear ends of the two main side plate bodies 121, thus closing the front and rear surfaces of the lithium battery. The end plate member 140 is illustrated in FIGS. 2 and 4. FIG. 4 is a plan view showing the end plate member 140.

Referring to FIG. 4, each end plate member 140 includes an end plate body 141, an upper fastening part 143, a lower fastening part 146, a heat dissipation window 142, 142' and insert slots 144. The end plate body 141 includes an outer plate 141a which is placed upright, and an inner plate 141b which is disposed at a predetermined position spaced apart from an inner surface of the outer plate 141a. The upper fastening part 143, 143' is provided on an upper end of the end plate body 141 so that the end plate body 141 is fastened to the upper plate member 110 by the upper fastening part 143, 143'. The lower fastening part 146 is provided under a lower end of the end plate body 141 so that the end plate body 141 is fastened to the lower plate member 130 by the lower fastening part 146. The heat dissipation window 142, 142' is formed through the outer plate 141a and the inner plate 141b to dissipate heat generated inside the lithium battery. The insert slots 144 are formed by spaces defined between the outer plate 141a and the inner plate 141b.

The end plate bodies 141 of the end plate members 140 are respectively inserted into the front and rear end parts 125 of the side plate bodies 121, thus closing off the front and rear ends of the side plate members 120. The upper and lower ends of the end plate body 141 are coupled to the upper plate member 110 and the lower plate member 130. Each end plate body 141 includes the outer plate 141a and the inner plate 141b.

The outer plate 141a and the inner plate 141b are upright plates which are bonded to each other such that a space is formed between their upper, lower and opposite side ends. The outer plate 141a is disposed at an outer position, while the inner plate 141b is disposed at an inner position and seated onto the stepped portion formed in the corresponding one of the front and rear end parts 125 of the side plate bodies 121.

The insert slots 144 are formed by spaces defined between the opposite side edges of the outer plate 141a and the inner plate 141b. The guide 123a of the side plate bodies 121 and 121' is inserted into the insert slots 144 in such a way that the end plate member 140 is moved downwards along the corresponding ends of the front and rear end parts 125 of the side plate bodies 121 and 121' to fasten the end plate member 140 to the side plate bodies 121 and 121'.

Figure 5:
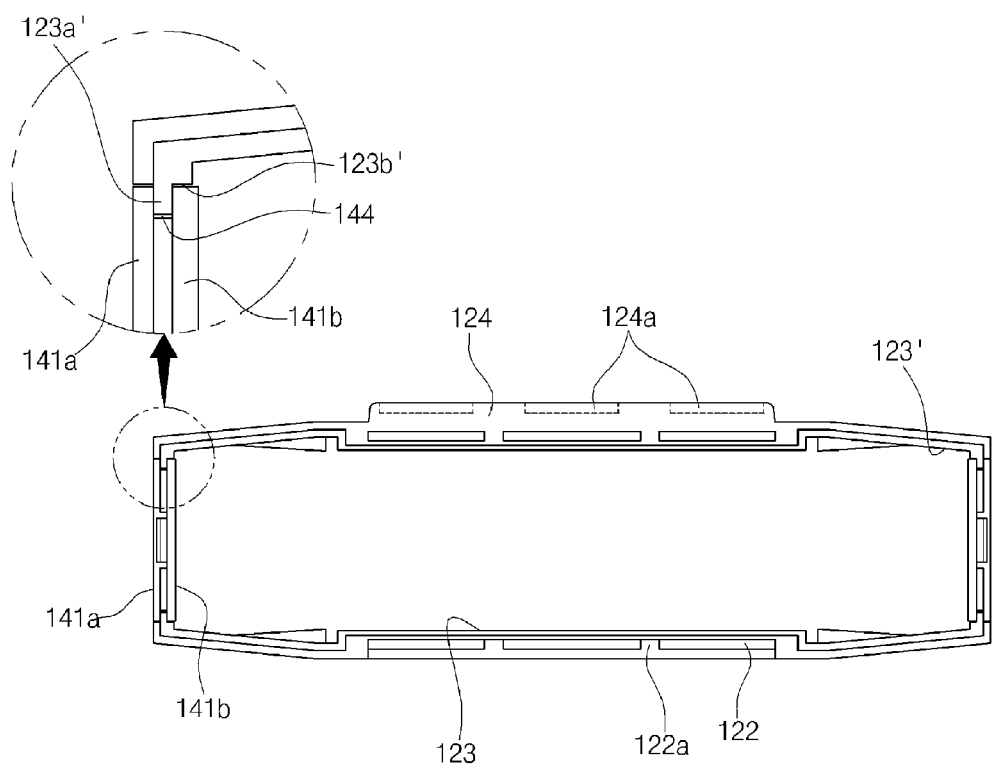
FIG. 5 is a plan view illustrating the coupling relationship between the end plate members and the side plate members of the lithium battery according to the embodiment of the present invention.

The structure that couples the guide 123a to the insert slot 144 is clearly shown in the partially enlarged view of FIG. 5. The guide 123a extends from the upper insert plate 123 and the lower insert plate 126 of the side plate body 121, and the opposite ends thereof are bent towards the opposing side plate body.

The guide 123a is inserted into the corresponding insert slot 144 between the outer plate 141a and the inner plate 141b and guides the end plate member 140 so that the end plate member 140 can slide in the vertical direction. This allows the end plate member 140 to be coupled to the side plate bodies 121.

As such, the shape of the guide 123a is such that the front end thereof is bent from each of the opposite ends of each side plate boby and protrudes a predetermined distance so that it can be inserted into the corresponding insert slot 144. Furthermore, a stepped portion 123b, 123b' is formed adjacent to the front end of the guide 123a, so that the corresponding side edge of the inner plate 141b is seated onto the stepped portion 123b, 123b'.

The upper fastening part 143, 143' includes at least one first insert protrusion 143b, 143b' which protrudes upwards from the upper end of the end plate body 141, and a first locking protrusion 143a, 143a' which is locked to the corresponding upper locking slot 112 of the upper plate member 110.

The first insert protrusion 143b, 143b' protrudes upwards from the upper end of each end plate body 141. In this embodiment, the first insert protrusion 143b, 143b' is an upright plate and is seated onto the stepped portion formed in the inner surface of the vertical extension panel 115 of the upper plate member 110.

The first locking protrusion 143a, 143a' is an upright plate which is provided with a hook formed on the end thereof. The first locking protrusion 143a, 143a' is inserted into the upper plate member 110 and is locked to the upper locking slot 112 using the hook.

The lower fastening part 146 includes at least one second insert protrusion 146b which protrudes downwards from the lower end of the end plate body 141, and a second locking protrusion 146a which is locked to a corresponding lower locking slot 134 of the lower plate member 130.

The second insert protrusion 146b protrudes downwards from the lower end of each end plate body 141. In this embodiment, the second insert protrusion 146b is a plate which extends downwards and is seated onto the stepped portion formed in the inner surface of the lower plate member 130.

The heat dissipation window 142, 142' is formed in each end plate body 141, and a plurality of connection bars 142a are horizontally provided in the heat dissipation window 142, 142' to discharge internal heat to the outside and prevent foreign substances from entering the lithium battery. To achieve this, the connection bars 142a may be horizontally oriented and fixed in the heat dissipation window 142, 142' at predetermined angles such that their upper surfaces are inclined downwards with respect to the outward direction.

The lower plate member 130 includes a bottom plate 131 which supports the battery module thereon; bottom end panels 133 and bottom side panels 132 which are provided upright on opposite ends and opposite side edges of the bottom plate 133; lower locking slots 134 which are formed in the respective bottom end panels 133 and to which the corresponding second locking protrusions 146a are removably locked; and lower stepped portions 132a which are provided on the inner surfaces of the bottom end panels 133 and the bottom side panels 132 so that the lower ends of the end plate members 140 and the lower ends of the side plate members 120 are inserted into the lower plate member 130 and seated onto the lower stepped portions 132a.

The bottom plate 131 is a planar plate which provides a space in which to contain the at least one battery cell.

The bottom end panels 133 extend upwards from the front and rear ends of the bottom plate 131. The lower ends of the end plate bodies 141, particularly, the second insert protrusions 146b and 146b', are inserted inside the bottom end panels 133 and are brought into close contact with the corresponding bottom end panels 133.

The lower locking slots 134 are formed in the respective bottom end panels 133. The hooks of the second locking protrusions 146a and 146a' that are inserted into the lower plate member 130 are inserted and locked into the corresponding lower locking slots 134.

The bottom side panels 132 vertically protrude upwards from the opposite side edges of the bottom plate 131. The lower ends of the side plate bodies 121 are inserted into the lower plate member 130 and are brought into close contact with the inner surfaces of the bottom side panels 132. In an embodiment of the present invention, the shape of each bottom side panel 132 corresponds to that of the corresponding upper depression 115a of the upper plate member 110. The lower stepped portions 132a are formed on the inner surfaces of the bottom side panels 132 such that the second insert protrusions 146b of the end plate members 140 and the lower insert plates 126 of the side plate members 120 are seated onto the corresponding lower stepped portions 132a. Here, the lower stepped portions 132a may be formed on the inner surfaces both of the bottom end panels 133 and of the bottom side panels 132.

Figure 6:
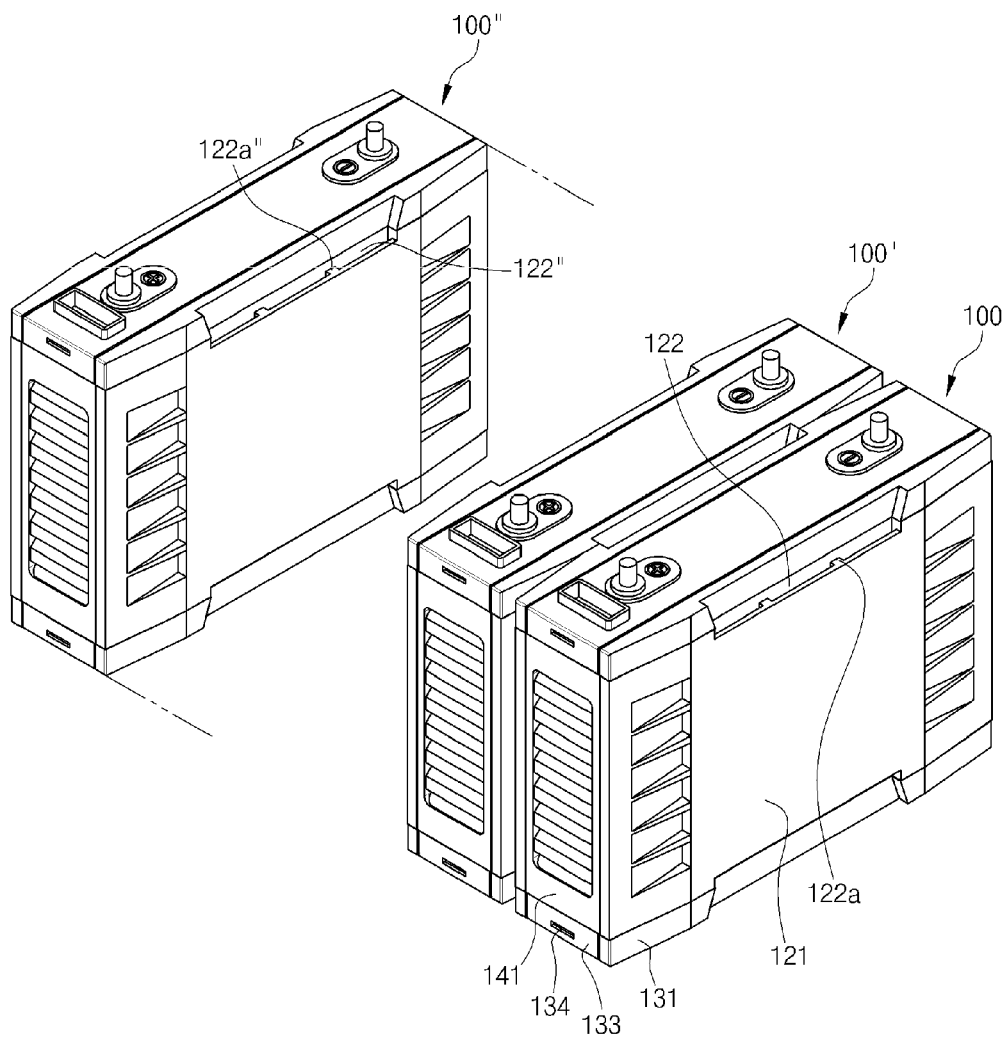
FIG. 6 is a perspective view illustrating the connection of several lithium batteries according to the embodiment of the present invention.
Figure 7:
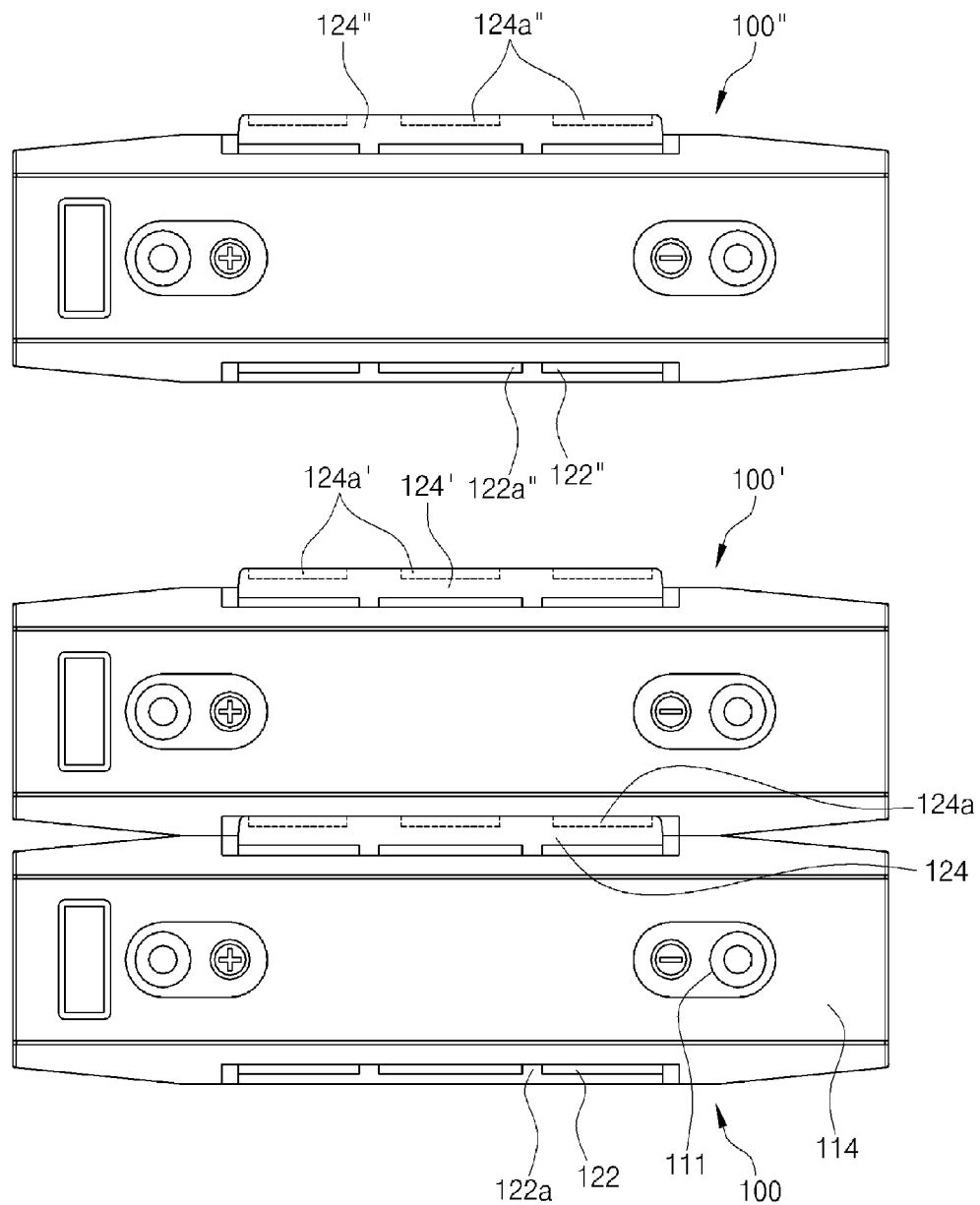
FIG. 7 is a plan view illustrating the connection of the lithium batteries according to the embodiment of the present invention.

FIGS. 6 and 7 are, respectively, a perspective view and a plan view illustrating the connection of several lithium batteries having the above-mentioned construction.

First, the assembly of each lithium battery will be explained.

Referring to FIGS. 6 and 7, the second insert plates 126 that protrude from the lower ends of the side plate bodies 121 are inserted into the lower plate member 130 such that they are brought into close contact with the inner surfaces of the bottom side panels 132 and are seated onto the lower stepped portions of the lower plate member 130. Thereafter, the end plates bodies 141 and 141' are respectively inserted into the front and rear ends of the open space between the side plate bodies 121.

In detail, the end plate bodies 141 and 141' are located above the corresponding guide 123a of the front and rear end parts 125 of the side plate bodies 121 such that the insert slots 144 of the end plate bodies 141 and 141' are aligned with the corresponding guide 123a. Subsequently, the end plate bodies 141 and 141' are moved downwards so that the guide 123a is inserted into the corresponding insert slots 144 of the end plate bodies 141 and 141'.

In this process, the end plate bodies 141 and 141' are moved downwards until the second insert protrusions 146b of the lower fastening part 146 formed on the lower ends of the end plate bodies 141 and 141' reach the lower stepped portions 132a formed on the inner surfaces of the bottom end panels 133. The second locking protrusions 146a and 146a' are locked to the corresponding second locking slots 134 that are formed in the bottom end panels 133 of the lower plate member 130. As a result, the end plate members 140, the side plate members 120 and the lower plate member 130 can be reliably fastened to each other.

Subsequently, the battery module that includes several battery cells connected to each other is placed onto the bottom plate 131 of the lower plate member 130. The upper plate member 110 is coupled to the side plate members 120 and the end plate members 140, thus closing off the internal space that contains the battery module.

At this time, the upper insert plates 123 of the side plate members 120 are seated onto the stepped portions that are formed in the lower end of the vertical extension panel 115. Further, the first locking protrusions 143a and 143a' of the upper fastening part 143 and 143' provided on the end plate members 140 are locked to the corresponding upper locking slots 112. The first insert protrusions 143b and 143b' are brought into close contact with the inner surface of the vertical extension panel 115.

The lithium battery that has been assembled by the above process can be connected to one or more other lithium batteries.

In detail, the connection plate 124 that extends in one direction from the side plate body 121 of a first lithium battery 100 is seated into the connection depression 122 of a second lithium battery 100'. In detail, the connection protrusion 124a that protrudes downwards from the lower surface of the connection plate 124 is inserted into the connection depression 122 of the second lithium battery 100'. Thereby, the first lithium battery 100 is mechanically connected to the second lithium battery 100'.

In the same manner, a third lithium battery 100" can also be connected to the second lithium battery 100'. That is, the second lithium battery 100' and the third lithium battery 100" are connected to each other in such a way that the connection plate 124' of the second lithium battery 100' is seated into the connection depression 122" of the third lithium battery 100" such that the connection protrusion 124a' is inserted into the connection depression 122".

In the lithium battery according to an embodiment of the present invention, the number of battery cells that are contained in the single lithium battery can be determined depending on a desired level of output power. For instance, when a battery of 50 A is required, a battery module including two 25 A bare cells can be used. If a battery of 100 A is needed, a battery module including four 25 A bare cells can be used.

If the number of bare cells increases, the entire size of the single lithium battery must also be increased. However, for convenience, the lithium battery may be designed in a comparatively small size.

Therefore, in the embodiments of the present invention, to reduce the size of the battery, front and rear case plates 240 and 230 that contain each bare cell 220 have asymmetrical structures to reduce the thickness of a single cell unit that is formed by the coupling of the front and rear case plates 240 and 230 with the single bare cell 220 interposed therebetween.

The battery cell module including at least one battery cell will be explained with reference to FIGS. 8 through 11.

Figure 8:
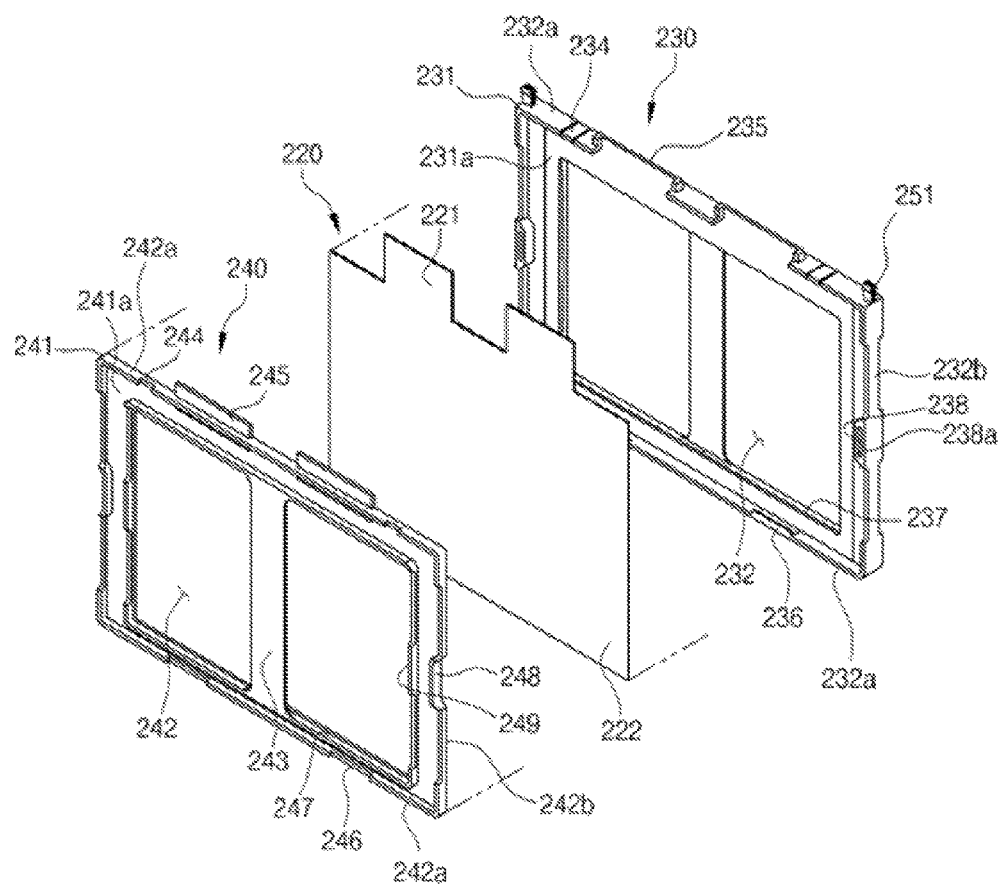
FIG. 8 is an exploded perspective view of a battery cell of the lithium battery according to the embodiment of the present invention.
Figure 9:
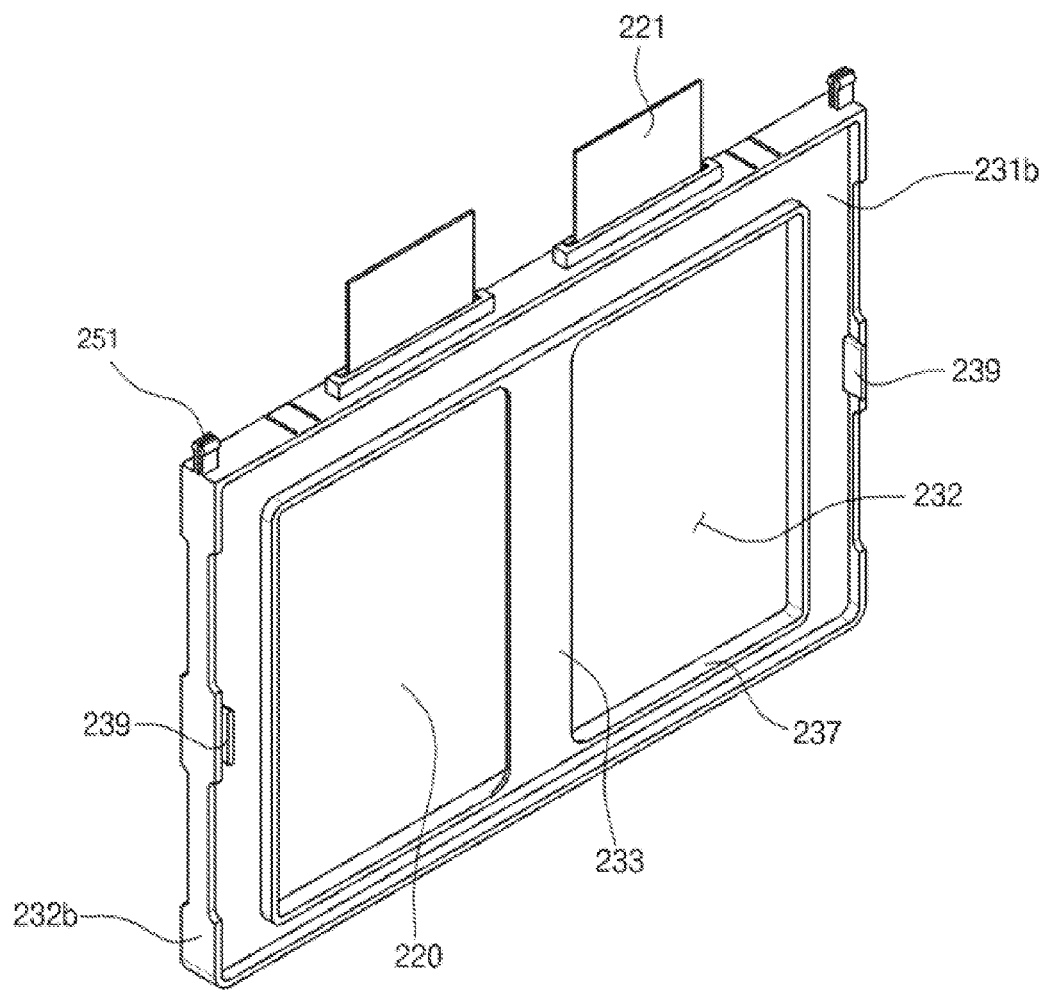
FIG. 9 is a perspective view of the battery cell of the lithium battery according to the embodiment of the present invention.

FIG. 8 is an exploded perspective view of a battery cell of the lithium battery according to an embodiment of the present invention. FIG. 9 is a perspective view of the battery cell of the lithium battery according to an embodiment of the present invention.

Referring to FIGS. 8 and 9, the battery module includes at least one battery cell. The battery cell includes a bare cell 220, and the front and rear case plates 240 and 230 which are coupled to each other with the bare cell 220 interposed therebetween.

The bare cell 220 includes a cell body 222 and a pair of battery tabs 221 which protrude upwards from the cell body 222 at positions spaced apart from each other and output different powers. The cell body 222 has upper, lower, left and right frame parts with which the front and rear case plates 240 and 230 are brought into close contact.

The front case plate 240 and the rear case plate 230 have structures that are to asymmetrical. The bare cell 220 is disposed between the front case plate 240 and the rear case plate 230, and the front case plate 240 is seated into an inner surface 231a of the rear case plate 230.

In detail, the front case plate 240 includes a front plate body 241, a front heat dissipation window 242, a front support bar 243, a front tab guide 245, front horizontal frames 242a, front vertical side frames 242b, first locking depressions 244 and second locking depressions 246. The front plate body 241 has an inner surface and an outer surface 241b and is placed upright. The first heat dissipation window 242 is formed in the front plate body 241 to dissipate heat generated by the bare cell 220. The first support bar 243 is provided upright in the first heat dissipation window 242 and is brought into contact with the front surface of the bare cell 220 to support it. The front tab guides 245 protrude upwards from the upper end of the front plate body 241 and support the corresponding battery tabs 221 of the bare cell 220. The front horizontal frames 242a horizontally extends along upper and lower edges of the front plate body 240 and protrude in a direction away from the bare cell 220 to form horizontal plates. The front vertical side frames 242b vertically extend from the opposite ends of the front horizontal frames 242a. The first locking depressions 244 and the second locking depressions 246 are respectively formed in the upper and lower front horizontal frames 242a.

The inner surface 241b of the front plate body 241 is a surface that is placed upright and is brought into close contact with the bare cell 220. The front horizontal frames 242a and the front vertical side frames 242b protrude from the upper, lower, left and right edges of the outer surface 241a.

The front horizontal frames 242a are horizontal surfaces that are provided on the upper and lower edges of the front plate body 241 and protrude in the direction away from the bare cell 220. When the front case plate 240 is coupled to the rear case plate 230 with the bare cell 220 disposed therebetween, the front horizontal frames 242a are seated onto the inner surface 231a of the rear case plate 230 and are brought into close contact with inner surfaces of rear horizontal frames 232a which will be explained later, so that the front case plate 240 is fitted into the rear case plate 230.

The front vertical side frames 242b are vertical surfaces which are provided on the opposite ends of the front plate body 241. The front vertical side frames 242b protrude in the direction away from the bare cell 10. Each front vertical side frame 242b includes a concave part 248 which corresponds to a convex part 238 that protrudes from the corresponding rear vertical side frame 232b towards the central portion of the battery.

The concave part 248 is a curved part that is depressed inwards from the outer surface of the front vertical side frame 242b and protrudes forwards from the front vertical side frame 242b.

The first locking depressions 244 are formed by cutting off portions of the front horizontal frame 242a that is provided on the upper end of the front plate body 241. The second locking depressions 246 are formed by cutting off portions of the front horizontal frame 242a that is provided on the lower end of the front plate body 241. Locking members 234 and lower stoppers 236 of the rear case plate 230 which will be explained later are locked into the corresponding first locking depressions 244 and the corresponding second locking depressions 246 so that the front case plate 240 that is seated onto the inner surface 231a of the rear case plate 230 is fastened to the rear case plate 230.

The front heat dissipation window 242 is an opening which is formed in a central portion of the front case plate 240 to dissipate heat generated by the bare cell 220.

The front case plate 240 further includes a front partition 247 which is provided around the front heat dissipation window 242 and protrudes from the outer surface 241a of the front case plate 240.

Protrusions 249 are provided on the front partition 247 at positions corresponding to the associated concave parts 248. Each protrusion 249 protrudes from the corresponding one of the opposite side parts of the front partition 247 to a distance corresponding to the length to which the concave part 248 protrudes from the front case plate 240.

The front support bar 243 is vertically provided between upper and lower ends of the front heat dissipation window 242 and supports the bare cell 220 disposed between the front case plate 240 and the rear case plate 230. The front support bar 243 is provided between planar surfaces that form the upper and lower ends of the front heat dissipation window 242. In detail, the front support bar 243 is provided on the upper surface of the front partition 247 that horizontally extends along the lower end of the front heat dissipation window 242, and the front heat dissipation window 242 is disposed on an edge of the upper surface of the front partition 247 that is on the side away from the bare cell 220. Thereby, a space is defined between the bare cell 220 and the front support bar 243.

The front tab guides 245 protrude from the front plate body 241 upwards and guide the battery tabs 221 of the bare cell 220. In this embodiment, each front tab guide 245 is a vertical plate which protrudes upwards from the upper surface of the front horizontal frame 242a.

The rear case plate 230 includes a rear plate body 231, a rear heat dissipation window 232, a rear support bar 233, the convex parts 238, circuit board support protrusions 214, rear tab guides 235, rear horizontal frames 232a, rear vertical side frames 232b, locking members 234, a rear partition 237 and coupling protrusions 239. The rear plate body 231 is placed upright and includes the inner surface 231a on which the bare cell 210 is supported, and an outer surface 231b to which the front case plate of another bare cell is coupled. The second heat dissipation window 232 is an opening that is formed in the rear plate body 231. The rear support bar 233 is vertically provided in the second heat dissipation window 232 to support the bare cell 220. The convex parts 238 protrudes inwards from the rear vertical side frames 232b and are seated into the corresponding concave part 248 of the front case plate 240. The circuit board support protrusions 214 support a circuit board (not shown) which is placed on the upper end of the battery cell. The rear tab guides 235 guide the corresponding battery tabs 221. The rear horizontal frames 232a horizontally extend along upper and lower edges of the rear plate body 231 and protrude in a direction toward the bare cell 220 to form horizontal plates. The rear vertical side frames 232b vertically extend from the opposite ends of the upper rear horizontal frame 232a to the lower rear horizontal frame 232a. The locking members 234 are locked into the corresponding first locking depressions 244 of the front case plate 240. The rear partition 237 is provided around the rear heat dissipation window 232 of the rear plate body 231 and protrudes from the rear plate body 231 in a direction away from the bare cell 210. The coupling protrusions 239 protrude from the opposite ends of the outer surface of the rear plate body 231

The rear horizontal frames 232a are horizontal surfaces that are provided on the upper and lower edges of the rear case plate 230 and protrude from the rear case plate 230 forwards and rearwards. When the front case plate 240 is seated onto the inner surface 231a of the rear case plate 230, the front horizontal frames 242a are brought into close contact with the inner surfaces of the rear horizontal frames 232a so that the front case plate 240 is fitted into the rear case plate 230.

The rear vertical side frames 232b vertically extend from the opposite ends of the rear horizontal frames 232a so that the upper and lower rear horizontal frames 232a are connected to each other.

The convex parts 238 protrude from the medial portions of the rear vertical side frames 232b towards the second heat dissipation window 232. Thus, when the front case plate 240 is seated into the inner surface 231a of the rear case plate 230, the convex parts 238 are inserted into the corresponding concave parts 248 so that the front case plate 240 can be reliably fastened to the rear case plate 230.

A coupling hole 238a is formed in a surface of each convex part 238 that faces the front case plate 240. The coupling protrusions 239 are provided on the outer surface of the rear case plate 230 at positions corresponding to the coupling holes 238a.

The coupling holes 238a are coupled to the corresponding coupling protrusions 239 that are provided on an adjacent battery cell.

That is, the coupling hole 238a is formed in the surface of the convex part 238 that corresponds to the inner surface 231a of the rear case plate 230 that faces the front case plate 240. The coupling protrusion 239 that has a bar shape is provided on the outer surface 231b of to the rear case plate 230 that is opposite to the surface of the convex part 238 that has the coupling hole 238a.

The rear partition 237 is provided on the upper, lower, left and right ends of the rear heat dissipation window 232 and protrudes from the outer surface of the rear plate body 231 in the direction away from the bare cell 220.

The rear heat dissipation window 232 is an opening that is formed in the rear plate body 231 to dissipate heat generated by the bare cell 220.

The rear support bar 233 vertically extends a predetermined length and connects the upper and lower ends of the rear partition 237 to each other. The function of the rear support bar 233 is to support the bare cell 220.

Each locking member 234 will be described in detail with reference to FIGS. 10 and 11.

Figure 10:
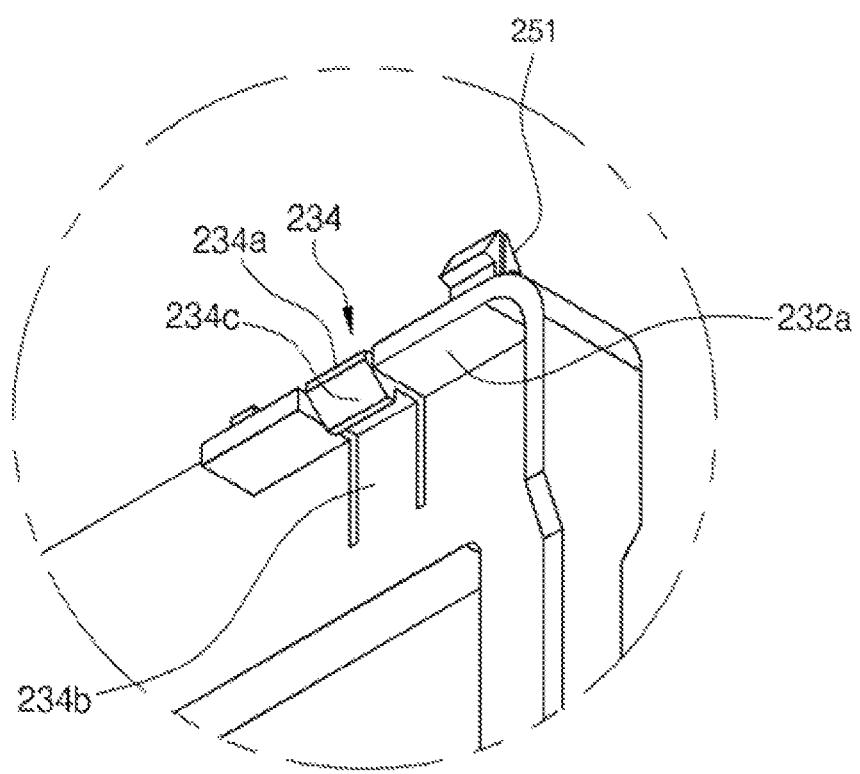
FIG. 10 is a perspective view showing a locking member of the lithium battery according to the embodiment of the present invention.

FIG. 10 is an enlarged perspective view of the locking member according to an embodiment of the present invention. FIG. 11 is a side sectional view of FIG. 10.

Figure 11:
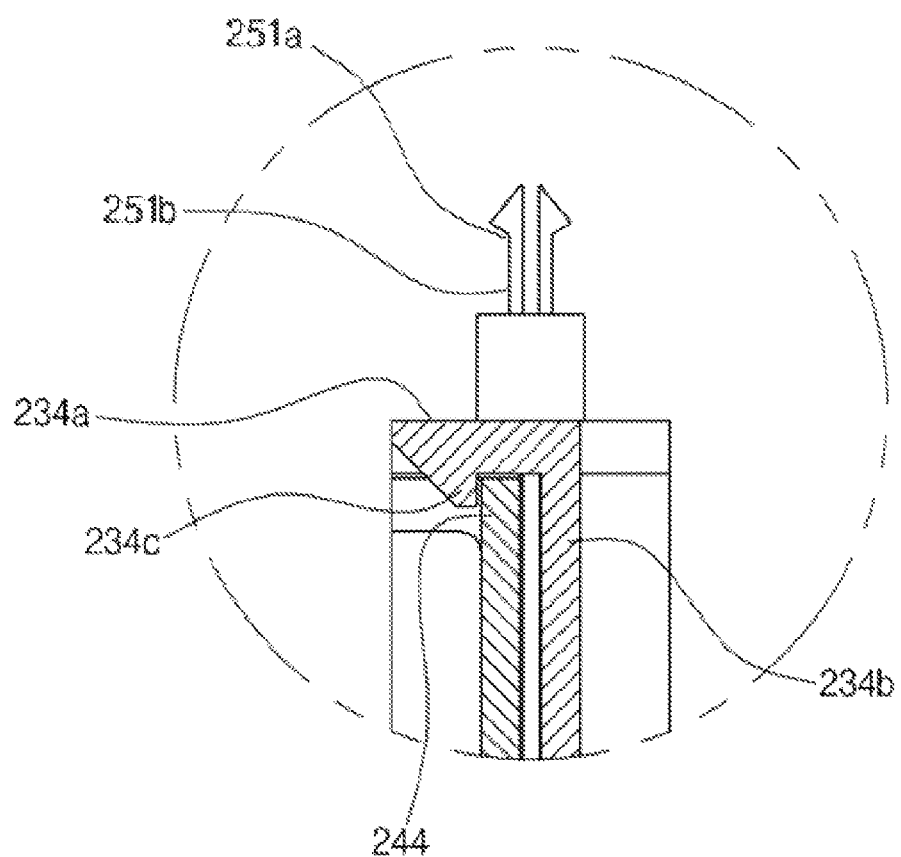
FIG. 11 is a side sectional view of the locking member of the lithium battery according to the embodiment of the present invention.

Referring to FIGS. 10 and 11, the locking member 234 includes a vertical part 234b which extends from the rear plate body 231, a horizontal part 234a which is bent from the vertical part 234b, and a hook 234c which protrudes downwards from the inner surface of the horizontal part 234a.

The vertical part 234b is configured such that a proximal end thereof extends from the rear plate body 231 and opposite side edges thereof are separated from the rear plate body 231. Therefore, the vertical part 234b can elastically move upwards or downwards on its proximal end that is fixed to the rear plate body 231.

The horizontal part 234a is bent from an upper end of the vertical part 234b. The horizontal part 234a is separated from the rear horizontal frame 232a.

The hook 234c protrudes downwards from the inner surface of the horizontal part 234a. The hook 234c has an inclined surface which extends from the end of the horizontal part 234a at a predetermined angle, and a vertical surface which is bent from a lower end of the inclined surface in the vertical direction.

As shown in FIG. 11, the locking member 234 is inserted into the corresponding first locking depression 244 of the front horizontal frame 242a of the front case plate 240, and the hook 234c is locked to a stop portion of the first locking depression 244 of the front case plate 240, thus fastening the front case plate 240 to the rear case plate 230.

The rear plate body 231 further includes lower stoppers 236 which protrude upwards from the surface of the rear horizontal frame 232a and are seated into the corresponding second locking depression 246 that are formed in the front horizontal frame 242a. In this embodiment, the lower stoppers 236 are disposed on the rear horizontal frame 232a at positions spaced apart from each other.

Each circuit board support protrusion 251 includes a support rod 251b which protrudes upwards from the upper end of the rear plate body 231. A triangular hook 251a that has a downwardly inclined surface is provided on the upper end of the support rod 251b.

Each rear tab guide 235 has a depression which is formed by cutting off a portion of the rear horizontal frame 232a that horizontally extends from the upper end of the rear plate body 231, thus forming a space into which the corresponding front tab guide 245 is inserted. The rear tab guide 235 protrudes upwards from a portion of the rear horizontal frame 232a that surrounds the depression. The rear tab guide 235 is coupled to the corresponding front tab guide 245, thus guiding and supporting the corresponding battery tab 221 of the bare cell 220 so that the battery tab 221 protrudes upwards from the front and rear tab guides 245 and 235.

The battery cell according to an embodiment of the present invention has the above-mentioned construction, and the assembly and effect thereof will be explained below.

First, the bare cell 220 is located on the inner surface of the rear case plate 230. The cell body 222 of the bare cell 220 is brought into close contact with the rear heat dissipation window 232, and the battery tabs 221 are seated into the rear tab guides 235.

Thereafter, the front case plate 240 is inserted inside the rear horizontal frames 232a and the rear vertical side frames 232b of the rear case plate 230, and the inner surface of the front to case plate 240 is brought into close contact with the bare cell 220 and the inner surface 231a of the rear case plate 230.

That is, the front horizontal frames 242a of the front case plate 240 are brought into close contact with the inner surfaces of the rear horizontal frames 232a. The front vertical side frames 242b of the front case plate 240 are brought into close contact with the inner surfaces of the rear vertical side frames 232b. At this time, the convex parts 238 are seated into the corresponding concave parts 248.

Furthermore, the locking members 234 are locked into the corresponding first locking depressions 244 of the front horizontal frame 242a while the front case plate 240 is fitted into the space between the rear horizontal frames 232a and the rear vertical side frames 232b of the rear case plate 230. In the process in which each locking member 234 is locked into the corresponding first locking depression 244, the horizontal part 234a of the locking member 234 can be elastically moved vertically while passing over the front horizontal frame 242a, because the vertical part 234b extends from the rear plate body 231 so as to be movable.

Therefore, each locking member 234 can be smoothly and elastically hooked to the corresponding first locking depression 244.

In addition, the lower stoppers 236 that protrude from the lower rear horizontal frame 232a are locked into the corresponding second locking depressions 246. As a result, the front case plate 240 is fixed in the rear case plate 230 by the locking members 234 and the lower stoppers 236.

As stated above, in the present invention, the front case plate 240 can be fixed to the rear case plate 230 in such a way that the front case plate 240 is fitted into the rear case plate 230 that has the concave structure. Thus, the assembly process is simplified, thereby markedly reducing the working time.

Moreover, a process of disassembling the front and rear case plates 240 and 230 from each other can also be simple. When the worker pushes the ends of the horizontal parts 234a of the locking members 234 upwards, the hook 234c provided on the lower surfaces of the locking members 234 are removed from the first locking depressions 244 of the front case plate 240. Then, the front case plate 240 can be easily separated from the inner surface 231a of the rear case plate 230.

Several battery cells each of which is assembled by the above-mentioned process are successively coupled to each other in such a way that the coupling protrusion 239 of the rear case plate 230 of each battery cell is inserted into the coupling hole 238a that is formed in the outer surface of the rear case plate 240 of an adjacent battery cell.

Hereinafter, a lithium battery according to another embodiment of the present invention will be described in detail with reference to the attached drawings.

Figure 12:
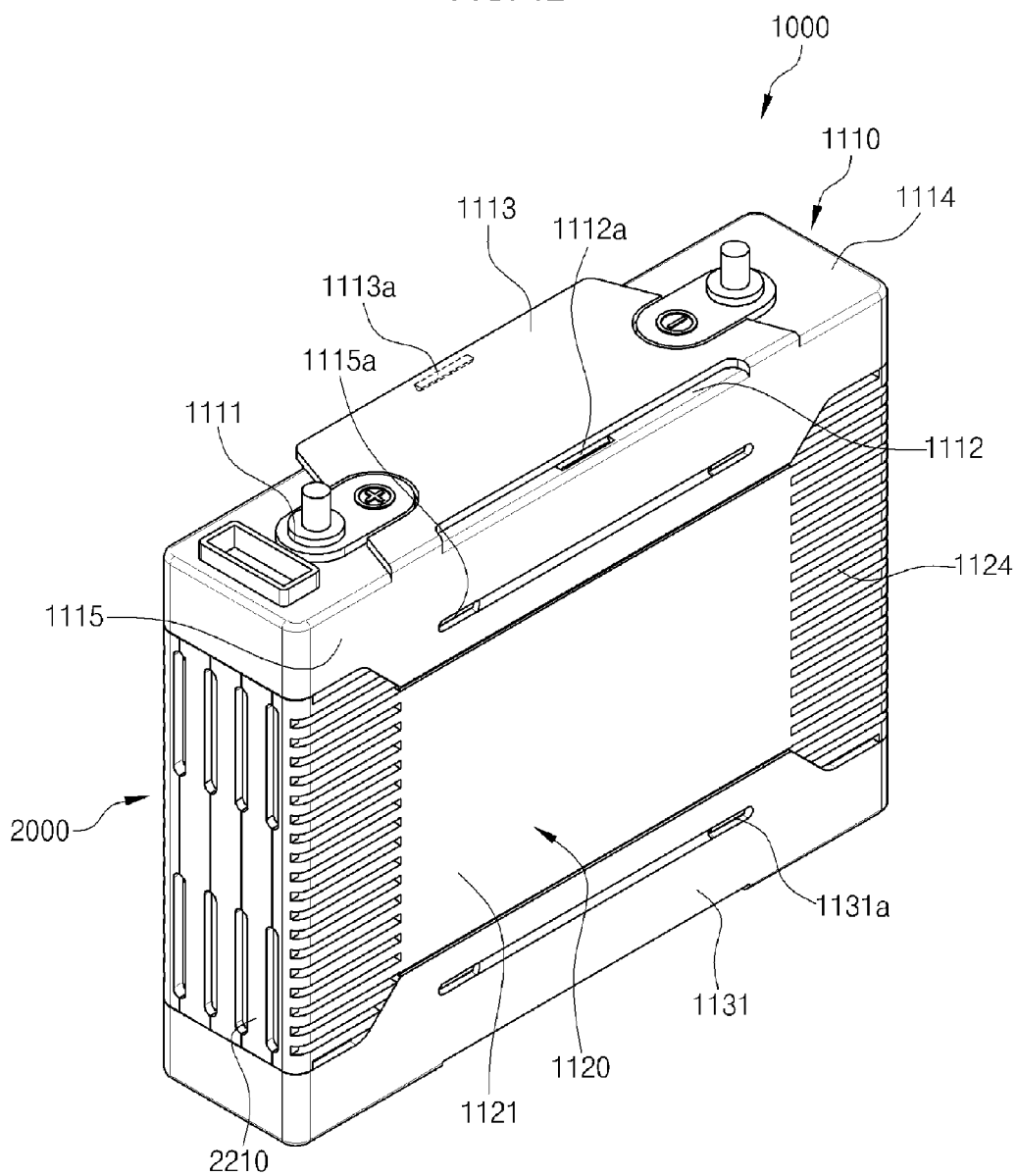
FIG. 12 is a perspective view illustrating a lithium battery, according to another embodiment of the present invention.
Figure 13:
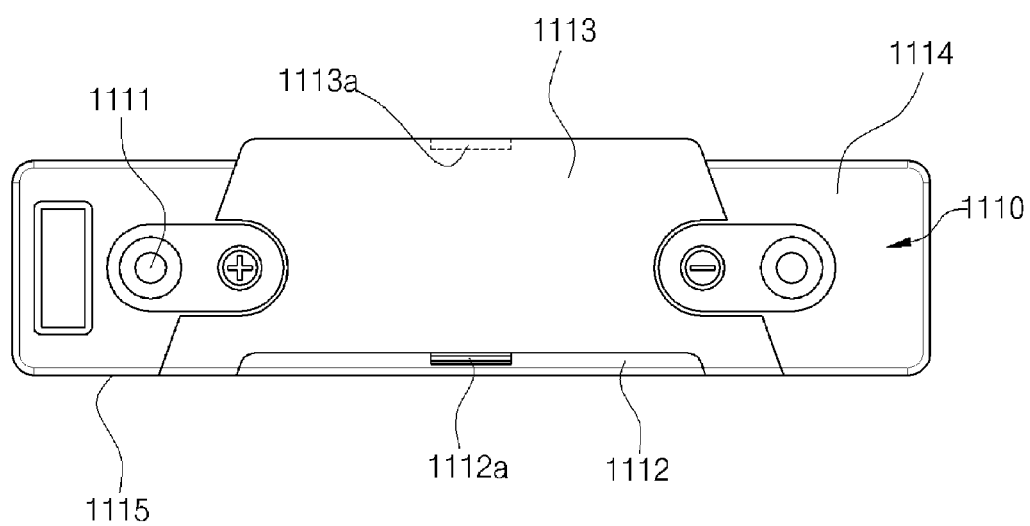
FIG. 13 is a plan view showing the lithium battery of FIG. 12.
Figure 14:
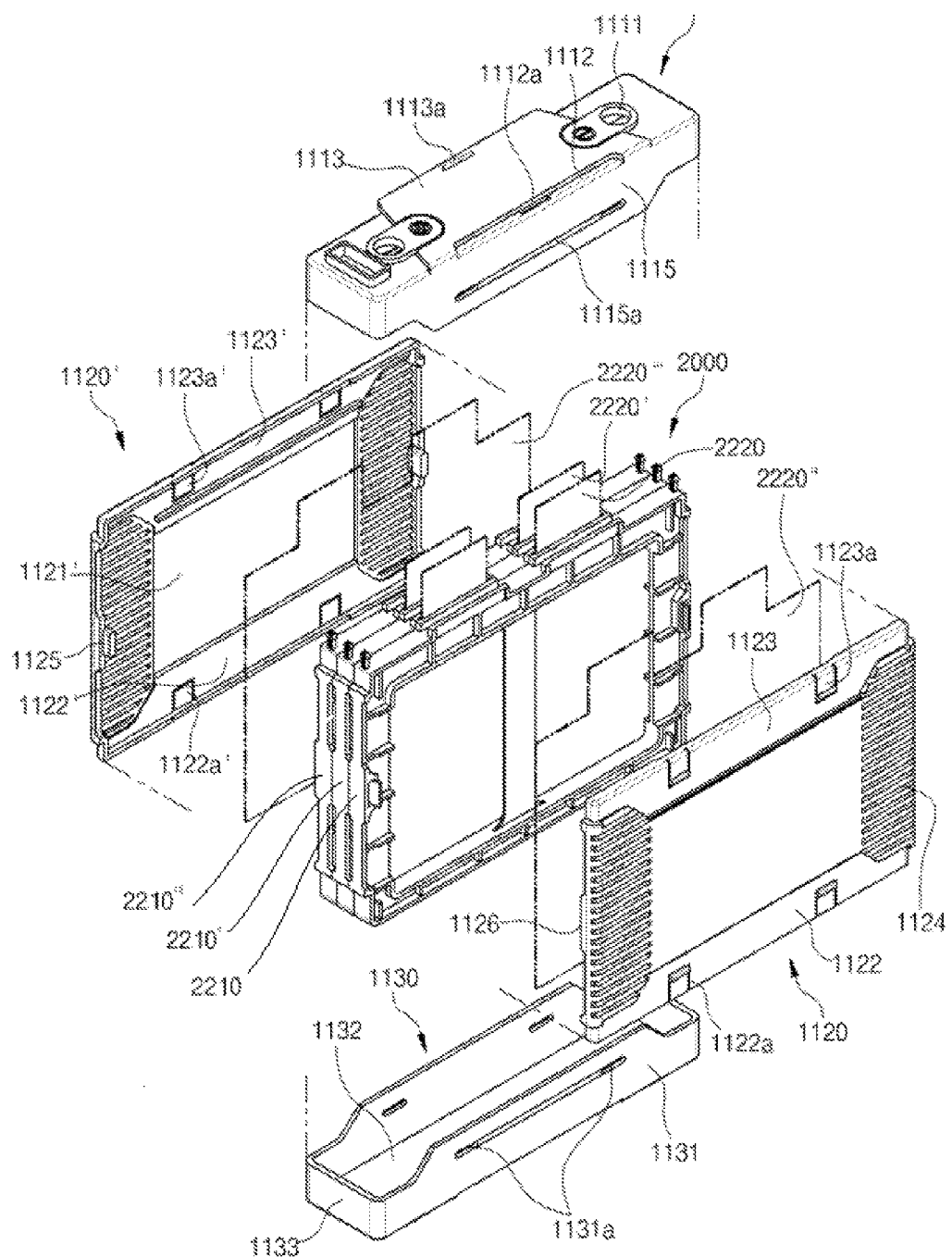
FIG. 14 is an exploded perspective view showing the lithium battery of FIG. 12.

FIG. 12 is a perspective view illustrating the lithium battery according to this embodiment of the present invention. FIG. 13 is a plan view showing the lithium battery of FIG. 12. FIG. 14 is an exploded perspective view showing the lithium battery of FIG. 12.

Referring to FIGS. 12 through 14, the lithium battery according to this embodiment of the present invention includes a battery module 2000 which includes one or more battery cells connected to each other, side plate members 1120 which are disposed on opposite sides of the battery module 2000, an upper plate member 1110 which is provided on upper ends of the side plate member 1120, and a lower plate member 1130 which forms the bottom of a space that contains the battery cells.

The upper plate member 1110 includes a top surface 1114, a vertical extension panel 1115 and a connection plate 1113. The vertical extension panel 1115 extends downwards from front, rear, left and right edges of the top surface 1114, thus forming front, rear, left and right surfaces of the upper plate member 1110. The connection plate 1113 extends from the top surface 1114 in one direction. An open slot 1112 is formed in a proximal end of the connection plate 1113 to expose the top surface 1114 to the outside, and the shape of the open slot 1112 corresponds to that of a distal end of the connection plate 1113. A connection hole 1112a is formed in the top surface 1114 inside the open slot 1112. At least one first locking slot 1115a is formed in each of surfaces of the vertical extension panel 1115 that face adjacent lithium batteries. The top surface 1114 has electrode pole holes 1111 through which electrode poles protrude outwards from the top surface 1114.

The vertical extension panel 1115 includes surfaces that extend downwards from the edges of the top surface 1114. The upper ends of the side plate members 1120 are inserted into and coupled to the vertical extension panel 1115.

The connection plate 1113 is a planar panel which extends from one edge of the top surface 1114 and is bent towards the opposite edge. A locking protrusion 1113a is provided under the lower surface of the end of the connection plate 1113. The locking protrusion 1113a is inserted into the connection hole 1112a formed in the top surface 1114 of an adjacent battery case.

In detail, the locking protrusion 1113a protrudes downwards from the lower surface of the connection plate 1113 and is inserted into the connection hole 1112a that is formed in the top surface 1114 of the adjacent battery case, thus connecting the lithium battery to the adjacent lithium battery. The shape of the distal end of the connection plate 1113 corresponds to that of the open slot 1112 so that when the lithium battery is connected to the adjacent lithium battery, the distal end of the connection plate 1113 is seated into the open slot 1112 of the adjacent lithium battery.

The open slot 1112 is formed in the proximal end of the connection plate 1113 so that the portion of the top surface 1114 that has the connection hole 1112a is exposed to the outside through the open slot 1112. The shape of the open slot 1112 corresponds to that of the distal end of the connection plate 1113. When the battery case 1100a is connected to adjacent battery case 1100b, the open slot of the battery case 1100b receives the distal end of a connection plate 1113 of the battery case 1100a.

The connection hole 1112a is formed in the portion of the top surface 1114 that is exposed to the outside by the open slot 1112. The locking protrusion 1113a of the connection plate 1113 of the adjacent lithium battery is inserted into the connection hole 1112a. In the single lithium battery, the connection hole 1112a is disposed at a position opposite to the locking protrusion 1113a of the connection plate 1113.

The at least one first locking slot 1115a is formed in each of the surfaces of the vertical extension panel 1115 that face the adjacent lithium batteries. The side plate members 1120 which will be explained later herein are locked to the corresponding first locking slots 1115a.

The lower ends of the side plate members 1120 are seated into the lower plate member 1130, and the upper ends of the side plate members 1120 are inserted into the upper plate member 1110 and are brought into close contact with the inner surface of the vertical extension panel 1115. To achieve this, each side plate member 1120 may include a side plate body 1121 which is placed upright; an upper end portion 1123 which is brought into close contact with the inner surface of the vertical extension panel 1115; at least one first elastic protrusion 1123a which is elastically provided in the upper end portion 1123 and is locked to the corresponding first locking slot 1115a of the vertical extension panel 1115; a lower end portion 1122 which is provided on the lower end of the side plate body 1121 and is inserted into the lower plate member 1130; at least one second elastic protrusion 1122a which is elastically provided in the lower end portion 1122 and is locked to the lower plate member 1130; and a heat dissipation slot 1124 which is formed in the side plate body 1121 to dissipate heat to the outside.

The two side plate bodies 1121 and 1121' are provided at positions spaced apart from each other and are placed upright at opposite sides on the lower plate member 1130. The upper ends of the side plate bodies 1121 and 1121' are inserted into the upper plate member 1110.

The upper end portion 1123 is provided on the upper end of the side plate body 1121 and inserted into the upper plate member 1110.

The at least one first elastic protrusion 1123a is provided in the upper end portion 1123 and is locked to the corresponding first locking slot 1115a formed in the vertical extension panel 1115, thus fastening the side plate body 1121 to the upper plate member 1110. To achieve this, the side plate body 1121 may be configured such that a proximal end thereof extends downwards from the side plate body 1121, and opposite side edges and a distal end thereof are separated from the side plate body 1121. Particularly, a hook which is removably locked to the corresponding locking slot 1115a is provided on the outer surface of the distal end of the first elastic protrusion 1123a.

The lower end portion 1122 is an upright surface which is provided in the lower end of the side plate body 1121. The lower edge of the lower end portion 1122 is seated onto the bottom of the lower plate member 1130, and the outer surface of the lower end portion 1122 is brought into close contact with the inner surface of the lower plate member 1130.

The second elastic protrusion 1122a is provided in the lower end portion 1122 and is locked to a corresponding one of the second locking slots 1131a that are formed in the inner surfaces of the sidewalls of the lower plate member 1130, thus fastening the side plate member 1120 to the lower plate member 1130. The second elastic protrusion 1122a is oriented in a direction opposite that of the first elastic protrusion 1123a. For example, in this embodiment, the second elastic protrusion 1122a is configured such that a proximal end thereof extends upwards from the lower end portion 1122 of the side plate body 1121, and opposite side edges and a distal end thereof are separated from the lower end portion 1122. In the same manner, a hook is also provided on the outer surface of the distal end of the second elastic protrusion 1122a. The hook of the second elastic protrusion 1122a is removably locked to the corresponding second locking slot 1131a of the lower plate member 1130.

The heat dissipation slot 1124 includes a plurality of heat dissipation slots which are formed in each side plate body 1121 and each of which horizontally extends a predetermined length. The heat dissipation slots 1124 function to dissipate heat generated by the battery module 2000 to the outside.

In this embodiment, two side plate members 1120 which have the same structure are provided. The first side plate body 1121 which is disposed at a first side and the second side plate body 1121' which is disposed at a second side have the same shape, and each of the first and second side plate bodies 1121 and 1121' has the upper end portion 1123, 1123' and the to lower end portion 1122, 1122' at the same positions. The first elastic protrusions 1123a and 1123a' are oriented in the same direction, and the second elastic protrusions 1122a and 1122a' are also oriented in the same direction.

However, the first side plate body 1121 includes fastening bars 1126 which are disposed at opposite ends of the surface of the first side plate body 1121 that faces the second side plate body 1121'. The fastening bars 1126 come into close contact with the front surface of a frontmost bare cell 2220'' of the battery module 2000 that is disposed between the first side plate body 1121 and the second side plate body 1121, thus supporting the battery module 2000. On the other hand, the second side plate body 1121' includes insert protrusions 1125 which protrude from opposite ends of the inner surface of the second side plate body 1121' towards the first side plate body 1121. The insert protrusions 1125 are coupled into corresponding coupling holes (2212b, refer to FIGS. 15 through 17) of a rearmost cell case so that a bare cell 2220''' that is disposed between the second side plate body 1121' and the rearmost cell case can be supported therebetween.

As such, the insert protrusions 1125 that are provided on the surface of the second side plate body 1121' are inserted into the corresponding coupling holes 2212b which are formed in the opposite ends of a cell case 2210 which will be explained later, thus coupling the battery cell to the second side plate body 1121'.

The lower plate member 1130 includes a bottom plate 1132; side panels 1131 which are provided upright on the left and right side edges of the bottom plate 1132; the second locking slots 1131a which are formed in the inner surfaces of the side panels 1131 with which the lower end portions 1122 of the side plate members 1120 are brought into close contact; and a front panel and a rear panel which are respectively provided upright on the front and rear ends of the bottom plate 1132.

The bottom plate 1132 is a planar plate, and the battery module 2000 and the lower end portions 1122 of the side plate bodies 1121 are seated onto the bottom plate 1132.

The side panels 1131 are provided upright on the opposite side edges of the bottom to plate 1132. The lower end portions 1122 of the side plate bodies 1121 are inserted into the lower plate member 1130 and are brought into close contact with the inner surfaces of the corresponding side panels 1131.

The bottom end panels 1133 are provided upright on the front and rear ends of the bottom plate 1132. The upper ends of the bottom end panels 1133 are continuous with the upper ends of the side panels 1131, and the upper ends of the side panel 1131 are higher than those of the bottom end panels 1133. Hence, an inclined portion 1134 is formed between the upper end of each side panel 1131 and the upper end of each of the bottom end panels 1133.

At least one second locking slot 1131a is formed in each side panel 1131. When the side plate members 1120 are inserted into the lower plate member 1130, the hooks provided on the ends of the second elastic protrusions 1122a of the side plate members 1120 are inserted into and hooked to the corresponding second locking slots 1131a of the side panels 1131.

In the battery module 2000, pouch type bare cells 2220, 2220', 2220", 2220''' are respectively seated onto a respective front surface 2211b and a respective rear surface 2211a of a cell case 2210. Several of these bare cells 2220, 2220', 2220" and 2220''' are electrically connected to each other. Particularly, this embodiment of the present invention is characterized in that the bare cells 2220, 2220', 2220" and 2220''' and the cell cases 2210 alternate with each other to form the battery module, and the outermost bare cells 2220" and 2220''' of the battery module are respectively supported by the inner surfaces of the side plate bodies 1121 and 1121'.

For instance, in the conventional technique, to produce a battery of 100 A, four 25 A bare cells and eight cell cases that support the front and rear surfaces of the four bare cells were required.

However, in this embodiment of the present invention, because the side plate bodies 1121 and 1121' respectively support the frontmost bare cell 2220" and the rearmost bare cell 2220''', only three cell cases are needed to produce a battery that outputs 100A. This cell case will be explained with reference to FIGS. 15 through 17.

Figure 15:
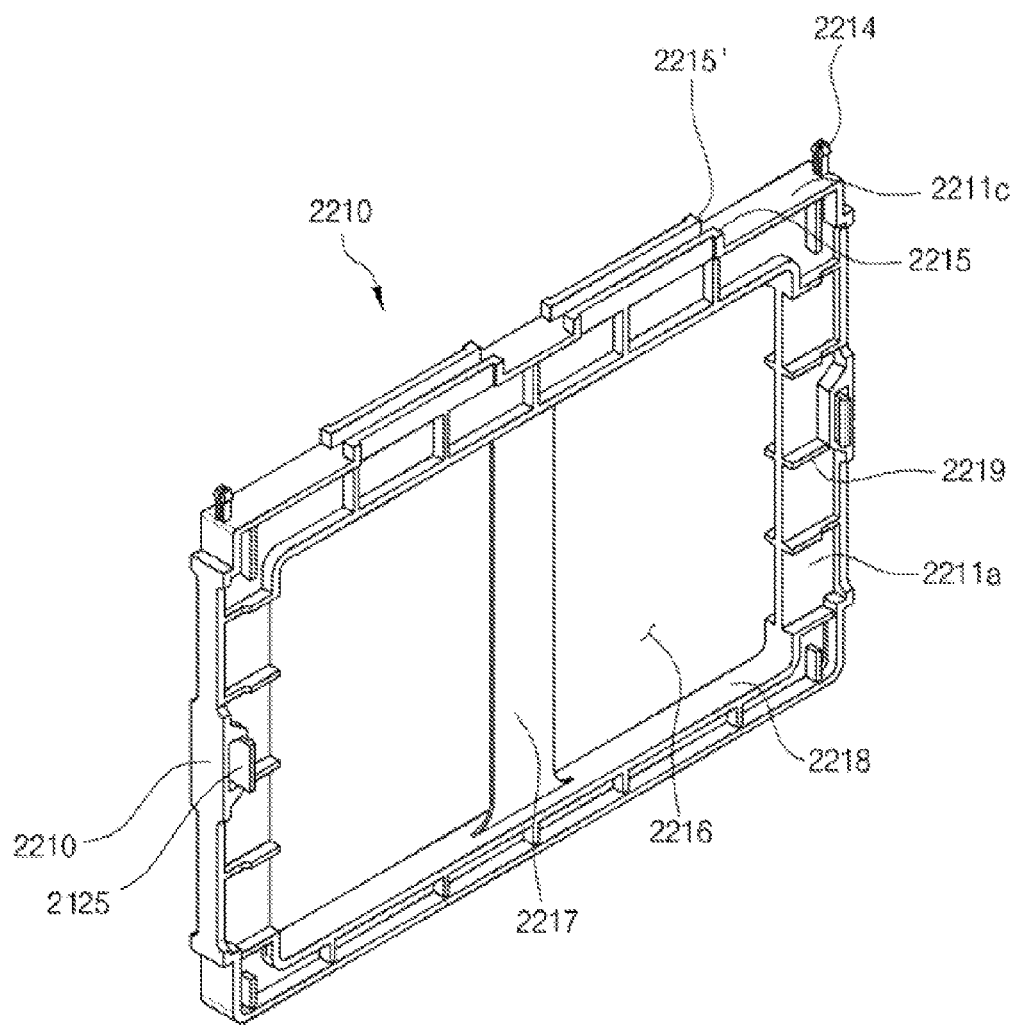
FIG. 15 is a front perspective view of a cell case of the lithium battery according to an embodiment of the present invention.
Figure 16:
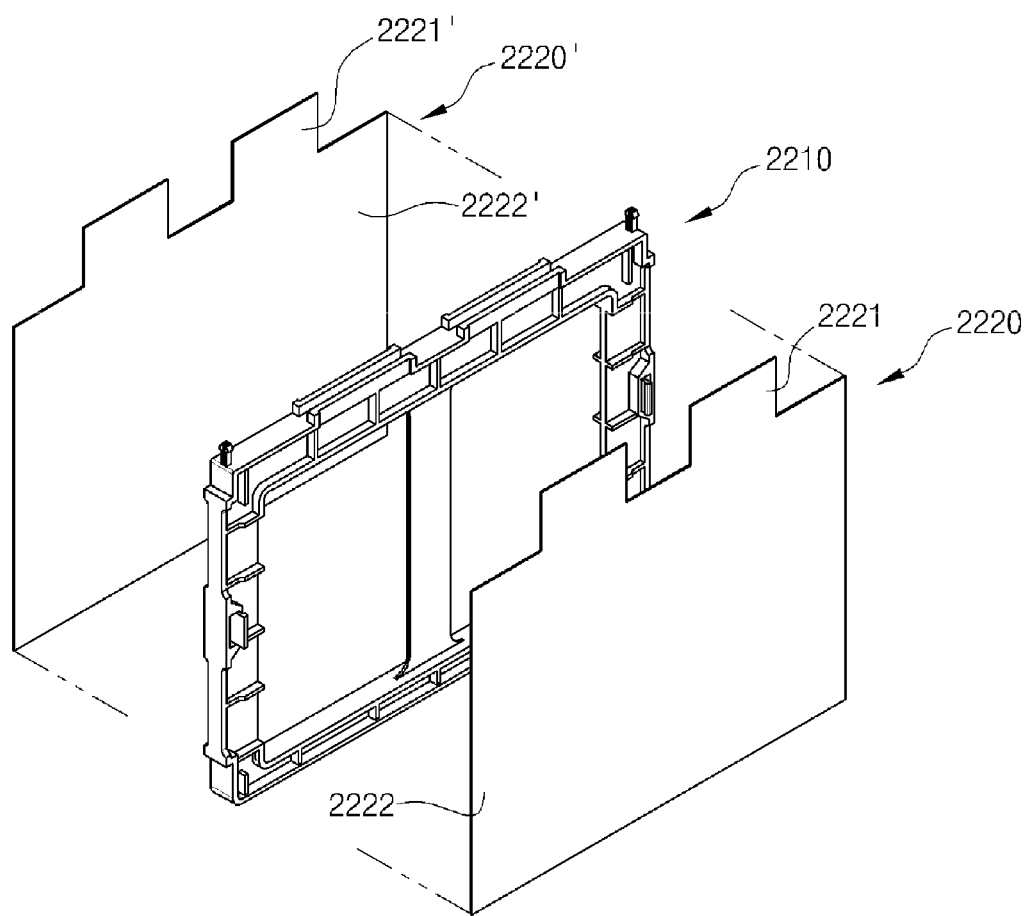
FIG. 16 is an exploded perspective view showing the battery cell of the lithium battery according to an embodiment of the present invention.
Figure 17:
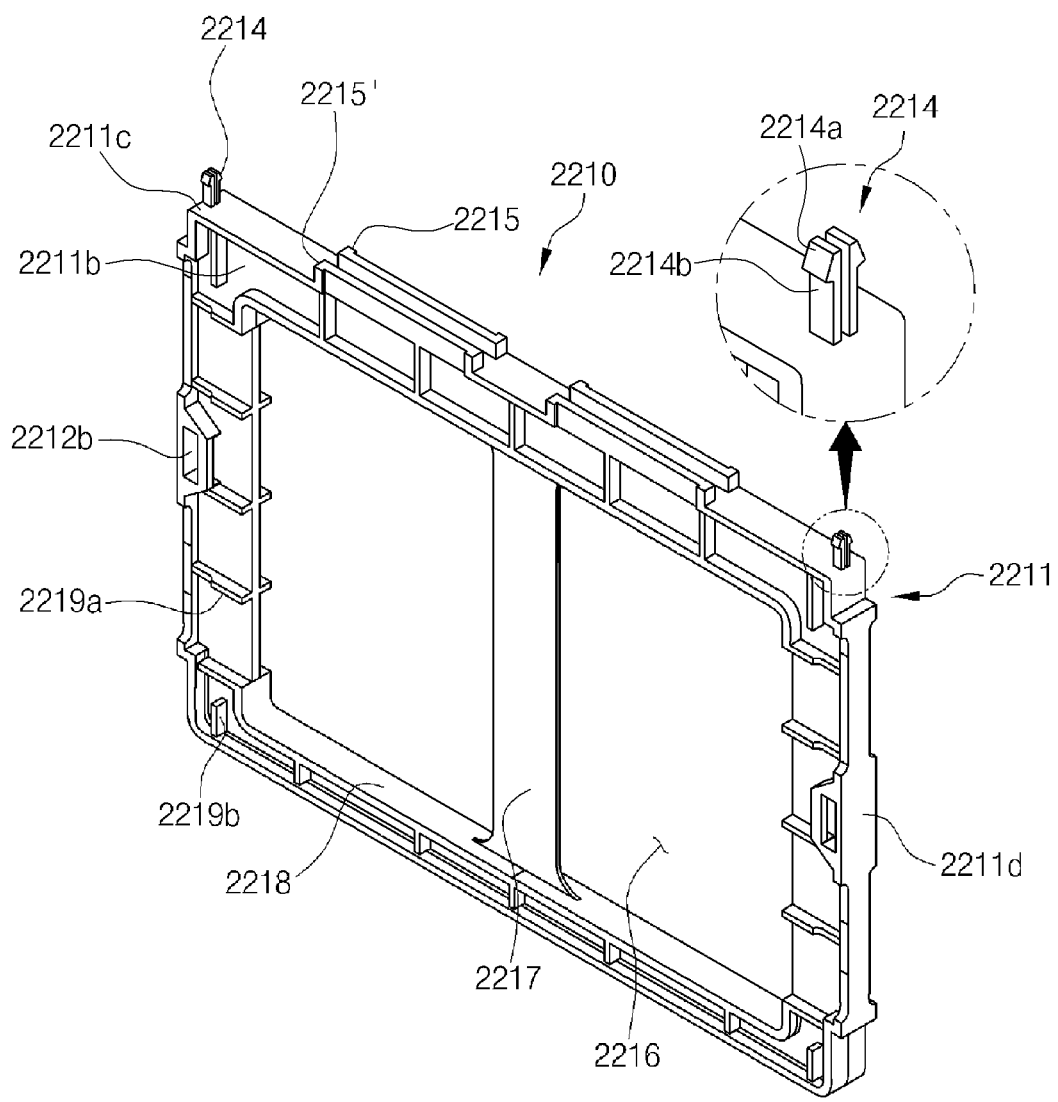
FIG. 17 is a rear perspective view of the cell case of the lithium battery according to an embodiment of the present invention.

FIG. 15 is a front perspective view of the cell case of the lithium battery according to an embodiment of the present invention. FIG. 16 is an exploded perspective view showing the battery cell of the lithium battery according to an embodiment of the present invention. FIG. 17 is a rear perspective view of the cell case of the lithium battery according to an embodiment of the present invention.

Referring to FIGS. 15 through 17, in the battery module 2000 according to an embodiment of the present invention, at least one cell case 2210 and two or more bare cells 2220~2220''' are alternately coupled to each other. The side plate bodies 1121 and 1121' respectively support the frontmost bare cell 2220" and the rearmost bare cell 2220''' of the battery module 2000.

For instance, if the output of the battery module 2000 is 50 A, the battery module 2000 includes a first cell case 2210, the front surface of which receives a first bare cell 2220, and the rear surface of which contains a second bare cell 2220'.

In this case, the first bare cell 2220 and the second bare cell 2220' are supported by the first cell case 2210, the first side plate body 1121 and the second side plate body 1121'.

If the output of the battery module 2000 is 100 A, the battery module 2000 includes four 25 A bare cells and three cell cases. In detail, the battery module 2000 includes: a first cell case 2210 which receives a first bare cell 2220; a second cell case 2210' which is brought into close contact with a rear surface of the first bare cell 2220, and receives a second bare cell 2220'; and a third cell case 2210" which is brought into close contact with a rear surface of the second bare cell 2220', and receives a third bare cell 2220".

Further, in this battery module 2000, the third bare cell 2220" is disposed between the inner surface of the first side plate body 2212 and the front surface of the first cell case 2210, and a fourth bare cell 2220''' is interposed between the inner surface of the second side plate body 1121' and the rear surface of the third cell case 2210".

This structure of the battery module 2000 can be realized because the front surface 2211a and the rear surface 2211b of the cell case 2210, along with the adjacent cell cases and 2210", support the bare cells 2220' and 2220" and because the side plate bodies function as the cell cases. Hereinafter, the structure of each cell case 2210 will be explained in more detail.

The cell case 2210 includes a case body 2211, coupling protrusions 2125, coupling holes 2212b, circuit board support protrusions 2214, tab guides 2215, a heat dissipation window 2216, a support bar 2217, horizontal support frames 2218 and partition ribs 2219. The case body 2211 has the front surface 2211a and the rear surface 2211b. The coupling protrusions 2125 protrude forwards from the opposite ends of the front surface 2211a of the case body 2211. The coupling holes 2212b are formed in respective portions that protrude rearwards from the opposite ends of the rear surface 2211b of the case body 2211. The circuit board support protrusions 2214 protrude upwards from the opposite ends of an upper horizontal frame 2211c that is provided in the upper end of the case body 2211. The tab guides 2215 protrude upwards from the upper horizontal frame 2211c of the case body 2211 to guide the corresponding battery tabs 221 of the bare cell 220. The heat dissipation window 2216 is formed through the case body 2211. The support bar 2217 is vertically provided in the medial portion of the heat dissipation window 2216 to support both bare cells 2220 that are disposed on opposite sides of the cell case 2210. The horizontal support frames 2218 are provided in the case body 2211 and form planar surfaces on upper and lower edges of the heat dissipation window 2216. The partition ribs 2219 protrude from the front surface 2211a and the rear surface 2211b of the case body 2211 forwards and rearwards.

The case body 2211 has the rear surface 2211b onto which the front surface of the bare cell 220 is seated, and the front surface 2211a which is brought into close contact with the rear surface of another bare cell. The case body 2211 includes the upper and lower horizontal frames 2211c which horizontally extend on the upper and lower edges of the case body 2211, and vertical side frames 2211d which vertically extend on opposite ends of the case body 2211. As such, in the case body 2211, spaces which receive the bare cells 2220 are formed on the front surface 2211a and the rear surface 2211b by the upper and lower horizontal frames 2211c and the vertical side frames 2211d.

The coupling protrusions 2125 are provided on the front surface of the case body 2211 at opposite sides of the bare cell 2220 so that the coupling protrusions 2125 can be inserted into the respective coupling holes 2212b of an adjacent cell case.

The coupling holes 2212b are formed in the rear surface of the case body 2211 at opposite sides of the bare cell 2220 so that the coupling protrusions 2125 of an adjacent cell case or the insert protrusions of the second side plate body 1121 are inserted into the respective coupling holes 2212b.

The tab guides 2215 and 2215' protrude upwards from the front and rear edges of the upper horizontal frame that horizontally extends from the upper end of the case body 2211. In detail, the two tab guides 2215 are provided on the front surface 2211a of the case body 2211 at positions spaced apart from each other. The two tab guides 2215' are provided on the rear surface 2211b of the case body 2211 at positions spaced apart from each other.

The tab guides 2215 and 2215' form depressions through which the battery tabs of the two bare cells 2220 that are seated onto the front surface 2211a and the rear surface 2211b of the cell case 2210 protrude upwards from the cell case 2210. To achieve this, each tab guide 2215, 2215' may protrude upwards from a portion of the upper horizontal frame that surrounds the corresponding depression formed in the upper horizontal frame, thus forming a space into which the corresponding battery tab is inserted.

The circuit board support protrusions 2214 protrude upwards from the opposite ends of the upper horizontal frame of the case body 2211 and support a circuit board. Each circuit board support protrusion 2214 includes two rods 2214b which are provided at positions spaced apart from each other by a predetermined distance. In an embodiment of the present invention, a triangular hook 2214a which has a downwardly inclined surface is provided on an upper end of each of the rods 2214b which are separated from each other.

In this structure, when the triangular hooks 2214a pass through a corresponding hole of the circuit board (not shown) that has a small diameter, the two rods that are separated from each other approach each other. After the triangular hooks 2214a have passed through the hole of the circuit board, the two rods are moved away from each other again by the elastic force so that the triangular hooks 2214a can be hooked to an upper surface (not shown) of the circuit board.

The heat dissipation window 2216 is formed in the case body 2211 to dissipate heat generated by the bare cells 2220 that are placed on the case body 2211.

The horizontal support frames 2218 are surfaces that horizontally extend on the upper and lower edges of the heat dissipation window 2216 formed in the case body 2211. In an embodiment of the present invention, the horizontal support frames 2218 have horizontal surfaces so that the bare cells 2220 that are seated onto the front and rear surfaces 2211a and 2211b of the case body 2211 are seated onto the horizontal surfaces of the horizontal support frames 2218.

The support bar 2217 is provided upright in a medial portion of the heat dissipation window 2216. The support bar 2217 is disposed at the medial portions of the horizontal support frames 2218 and partitions the bare cell 2220, which is brought into close contact with the front surface 2211a of the cell case 2210, from the bare cell 2220 which is brought into close contact with the rear surface 2211b of the cell case 2210.

The partition ribs 2219 include a plurality of vertical partition ribs 2219b which vertically extend on the front and rear surfaces 2211a and 2211b of the case body 2211, and a plurality of horizontal partition ribs 2219a which horizontally extend from the front and rear surfaces 2211a and 2211b. The vertical partition ribs 2219b and the horizontal partition ribs 2219a that are provided on the front and rear surfaces 2211a and 2211b of the case body 2211 reinforce the case body 2211 when the cell case 2210 is coupled to other cell case 2210. In addition, the vertical partition ribs 2219b and the horizontal partition ribs 2219a function to form a plurality of air flow passages between the adjacent cell cases.

In this embodiment, the main body of the first bare cell 2220 which includes the battery tabs 2221 spaced apart from each other is seated onto the heat dissipation window 2216 on the rear surface 2211b of the first cell case. Here, the battery tabs 2211 of the first bare cell 2220 are seated into the corresponding tab guides 2215 while the main body of the first bare cell to 2220 is seated onto the heat dissipation window 2216 and onto the horizontal support frames 2218. Furthermore, the first bare cell 2220 is supported by the support bar 2217 which is vertically provided in the medial portion of the heat dissipation window 2216.

The horizontal support frames 2218 are partitioned into two areas by the support bar 2217. That is, the support bar 2217 partitions the horizontal support frames 2218 into an area on which the bare cell that is seated onto the rear surface 2211b of the case body 2211 is placed, and an area onto which the bare cell that is seated onto the front surface 2211a of the case body 2211 is placed.

As such, a single battery cell includes the two bare cells that are provided on the front and rear surfaces of the cell case. For example, if a lithium battery of 100 A is required, the battery module may have four 25 A bare cells and be installed in the battery case.

For this, among the first through fourth bare cells 2220, the first bare cell 2220 is seated onto the rear surface 2211b of the first cell case 2210. Subsequently, the second cell case 2210' is coupled to the first cell case 2210 in such a way that the coupling protrusions 2125 of the second cell case 2210' are fitted into the coupling holes 2212b of the first cell case 2210 while the front surface 2211a of the second cell case 2210' is brought into close contact with the rear surface of the first bare cell 2220.

In the same manner, after the second bare cell 2220' has been seated onto the rear surface 2211b of the second cell case 2210', the third cell case 2210" is coupled to the second cell case 2210' in such a way that the coupling protrusions 2125 of the third cell case 2210" are fitted into the coupling holes 2212b of the second cell case 2210' while the front surface 2211a of the third cell case 2210" is brought into close contact with the rear surface of the second bare cell 2220'.

Thereafter, the third bare cell 2220" is seated onto the front surface of the first cell case 2210, and the fourth bare cell 2220''' is seated onto the rear surface of the third cell case 2210". Subsequently, the third and fourth bare cells 2220" and 2220''' are brought into close contact with the inner surface of the corresponding side plate bodies.

Here, the insert protrusions 1125 that protrude from the second side plate body 1121' are fitted into the corresponding coupling holes 2212b of the third cell case 2210" that is disposed at the frontmost position. Thereby, the fourth bare cell 2220''' is fixed between the second side plate body 1121' and the third cell case 2210". In the same manner, the third bare cell 2220" is fixed between the first cell case 2210 and the first side plate body 1121.

As such, in the present invention, for example, if a lithium battery, the output of which is 100 A, is required, four 25 A bare cells and three cell cases are used. If a lithium battery having the output of 50 A is required, two 25 A bare cells and a single cell case are used to form a battery module. Therefore, the number of cell cases can be reduced compared to that of the conventional technique. The reduction in the number of cell cases can result in a reduction of the size of the entire lithium battery.

Figure 18:
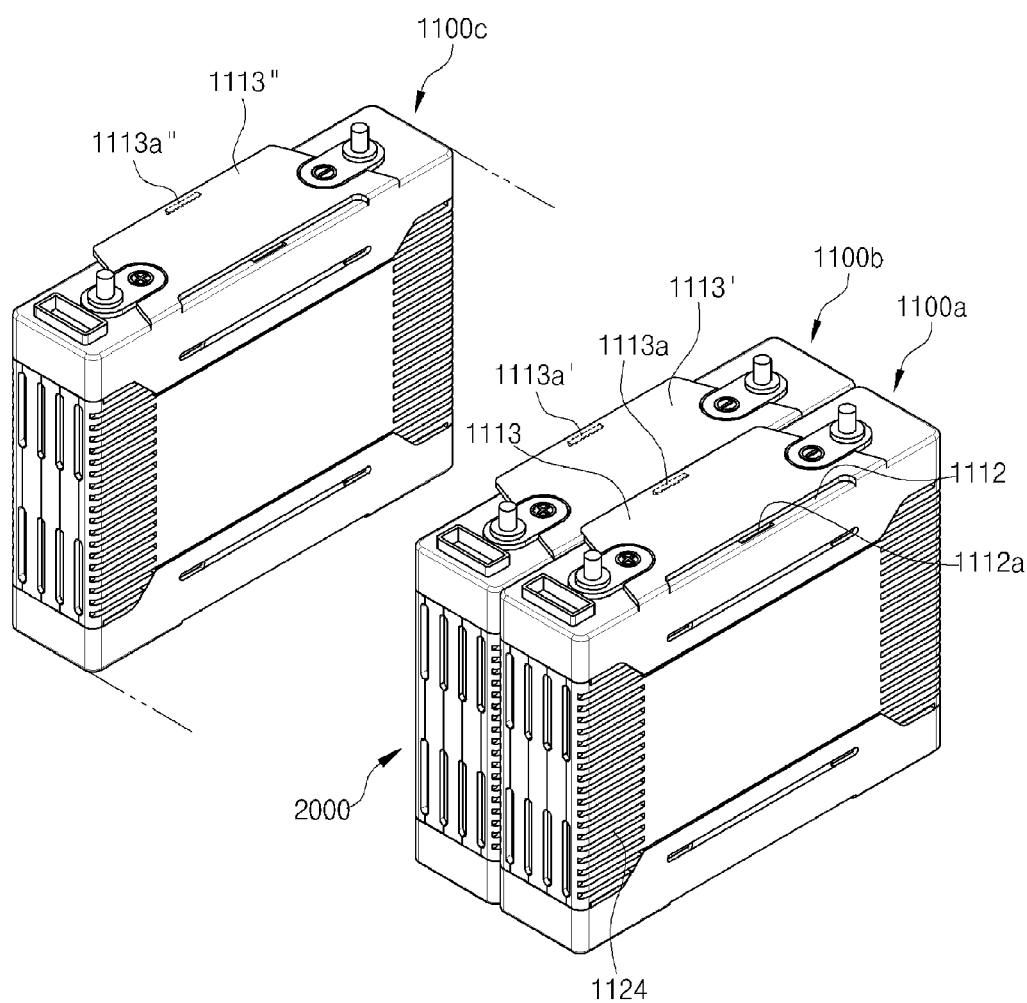
FIG. 18 is a perspective view illustrating a process of connecting several lithium batteries of FIG. 12 to each other according to an embodiment of the present invention.

FIG. 18 is a perspective view illustrating a process of connecting several lithium batteries to each other according to an embodiment of the present invention.

Referring to FIG. 18, a user may use a single lithium battery to be used at home or for portable use. If an amount of power greater than the amount of power output from the single lithium battery is required, two or more lithium batteries can be electrically connected to each other so that the desired amount of power can be produced.

To reduce an area required by the connected batteries and prevent an accident from being caused by the contact with a peripheral pedestrian or from being caused by other surrounding conditions, it is necessary to mechanically connect the lithium batteries to each other.

For this, the locking protrusion 1113a which is provided under the lower surface of the connection plate 1113 of a first battery case 1100a is fitted into the connection hole 1112a which is formed in the upper surface of the upper plate member that is accessible through the open slot 1112 of a second battery case 1100b. The locking protrusion 1113a may have a downwardly inclined surface so that it can be hooked to the connection hole 1112a.

After the first battery case 1100a and the second battery case 1100b have been coupled to each other, the connection plate 1113 of the second battery case 1100b is coupled to the connection hole 1112a of a third battery case 1100c. As such, several battery cases can be coupled to each other.

As described above, in embodiments of the present invention, a lithium battery which contains two or more battery cells has a structure that can be separably coupled to another lithium battery in an insert coupling manner. Therefore, several lithium batteries can be connected to each other, and the connected state can be reliably maintained. In addition, when it is necessary to separate the lithium batteries from each other, they can be easily separated. Thus, the convenience and safety of use can be enhanced.

Furthermore, in the lithium battery of the embodiments of the present invention, battery cells can be coupled to each other in an insert coupling manner, for example, in a such a way that a front case plate of a battery cell is inserted into a rear case plate of an adjacent battery cell, without using a separate locking member or coupling device. Therefore, the number of assembly processes and the working time can be reduced, and the size of the lithium battery can also be reduced.

Moreover, in the embodiments of the present invention, a battery case which contains one or more battery cells can function as a cell case that supports the bare cells. Therefore, the size of the lithium battery can be further reduced. In addition, because the number of elements is reduced, the production cost can also be reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium battery comprising:
  a battery module having battery cells electrically connected to each other such that power of different poles is input into or output from the battery cells;
  an upper plate member forming an upper surface of the lithium battery, the upper plate member covering an upper end of the battery module contained in the lithium battery;
  a lower plate member forming a bottom plate of a space that contains the battery module therein; and
  a pair of side plate members placed upright and facing each other, the side plate members being coupled at upper ends thereof to the upper plate member and coupled at lower ends thereof to the lower plate member,
  wherein the upper plate member comprises:
    a connection plate extending from a top surface of the upper plate member in one direction, with a locking protrusion formed under a lower surface of the connection plate;
    an open slot formed in the top surface at a position opposite to the connection plate, the open slot having a shape corresponding to a distal end of the connection plate; and
    a connection hole formed inside the open slot so that, when the lithium battery is connected to another lithium battery, the locking protrusion of the connection plate of the lithium battery is removably locked into the connection hole of said another lithium battery.

2. The lithium battery as set forth in claim 1, wherein the upper plate member comprises vertical extension panels extending from opposite side edges of the top surface, the vertical extension panels comprised of a first vertical extension panel and a second extension panel facing each other, and each of the first and second extension panels has at least one first locking slot;
  the lower plate member comprises side panels vertically protruding upwards from opposite side edges of the bottom plate, the side panels comprised of a first side panel and a second side panel facing each other, and each of the first and second side panels has at least one second locking slot; and
  each of the side plate members comprises:
    a first elastic protrusion provided on an upper end of the side plate member, the first elastic protrusion being locked to one of the first locking slots formed in the first and second vertical extension panels; and
    a second elastic protrusion provided on a lower end of the side plate member, the second elastic protrusion being locked to one of the second locking slots formed in the first and second side panels.

3. The lithium battery as set forth in claim 1, wherein each of the side plate members comprises a side plate body coupled at an upper end thereof to the upper plate member and coupled at a lower end thereof to the lower plate member, and
  the battery module comprises at least one battery cell having a cell case and bare cells provided on front and rear surfaces of the cell case such that the cell case and the bare cells alternate with each other, wherein one side surface of each of outermost bare cells is supported by the front or rear surface of the cell case, and a remaining side surface of the outermost bare cell is supported by an inner surface of one of the side plate bodies.

4. The lithium battery as set forth in claim 2, wherein the first elastic protrusion has a hook on a distal end of the first elastic protrusion, and the hook is locked into the first locking slot; and
  the second elastic protrusion has a hook on a distal end of the second elastic protrusion, and the hook is locked into the second locking slot.

5. The lithium battery as set forth in claim 1, wherein each of the battery cells comprises a cell case containing pouch type bare cells, the cell case comprising:
  a case body placed upright and receiving the bare cells, the cell case having an upper horizontal frame and a lower horizontal frame respectively provided on upper and lower edges of the case body, and vertical side frames extending between opposite ends of the upper and lower horizontal frames;
  a coupling protrusion protruding from a first surface of the case body in one direction; and
  a coupling hole formed in a second surface of the case body so that the coupling protrusion of another cell case is inserted into the coupling hole.

6. The lithium battery as set forth in claim 5, wherein either of the side plate members further comprises
an insert protrusion provided on at least one surface thereof that faces the battery module contained in the lithium battery, the insert protrusion being inserted into the coupling hole of the cell case.

7. The lithium battery as set forth in claim 5, wherein the cell case comprises:
tab guides protruding upwards from an upper end of the case body,
wherein the tab guides comprise: a pair of tab guides disposed at a side corresponding to a front surface of the case body at positions spaced apart from each other; and a pair of tab guides disposed at a side corresponding to a rear surface of the case body at positions spaced apart from each other.

8. The lithium battery as set forth in claim 5, wherein the cell case further comprises
a circuit board support protrusion protruding upwards from the upper horizontal frame that forms an upper surface of the case body, the circuit board support protrusion supporting a circuit board,
wherein the circuit board support protrusion comprises two rods spaced apart from each other, with a hook protruding from an upper end of each of the two rods, the hook having a downwardly inclined surface.

9. The lithium battery as set forth in claim 5, wherein the cell case further comprises:
a heat dissipation window formed in the case body to dissipate heat generated by the bare cells;
horizontal support frames provided in the case body and forming planar surfaces extending in the horizontal direction on upper and lower edges of the heat dissipation window so that the bare cells are respectively seated onto the front and rear surfaces of the case body; and
a support bar vertically provided in a medial portion of the heat dissipation window and fastened to the horizontal support frames.

10. The lithium battery as set forth in claim 5, wherein the cell case further comprises:
a plurality of vertical partition ribs provided on the front and rear surfaces of the case body, each of the vertical partition ribs extending a predetermined length vertically; and
a plurality of horizontal partition ribs provided on the front and rear surfaces of the case body, each of the horizontal partition ribs extending a predetermined length horizontally.

11. The lithium battery as set forth in claim 1, wherein each of the side plate members further comprises a plurality of heat dissipation slots formed to dissipate heat generated by the battery module.

* * * * *